United States Patent
Stingu et al.

(10) Patent No.: US 11,770,023 B2
(45) Date of Patent: Sep. 26, 2023

(54) WIRELESS POWER TRANSFER METHOD, CIRCUIT AND APPARATUS

(71) Applicant: Spark Connected LLC, Dallas, TX (US)

(72) Inventors: Petru Emanuel Stingu, Dallas, TX (US); Malek Ramezani, Farmers Branch, TX (US); Kenneth Moore, Dallas, TX (US); Ruwanga Dassanayake, Dallas, TX (US); Yulong Hou, Farmers Branch, TX (US)

(73) Assignee: Spark Connected LLC, Dallas, TX (US)

( * ) Notice: Subject to any disclaimer, the term of this patent is extended or adjusted under 35 U.S.C. 154(b) by 206 days.

(21) Appl. No.: 16/904,108

(22) Filed: Jun. 17, 2020

(65) Prior Publication Data

US 2021/0399581 A1    Dec. 23, 2021

(51) Int. Cl.
*H02J 50/00* (2016.01)
*H02J 50/80* (2016.01)
(Continued)

(52) U.S. Cl.
CPC ............ *H02J 50/12* (2016.02); *F21V 23/003* (2013.01); *H01F 38/14* (2013.01); *H02J 50/80* (2016.02);
(Continued)

(58) Field of Classification Search
CPC ...... H01F 38/14; F21Y 2115/10; H02J 50/80; H02J 50/00; H02J 50/10; H02J 50/12;
(Continued)

(56) References Cited

U.S. PATENT DOCUMENTS

| | | |
|---|---|---|
| 5,051,875 A | 9/1991 | Johnson |
| 6,184,628 B1 | 2/2001 | Ruthenberg |

(Continued)

FOREIGN PATENT DOCUMENTS

JP    2002009566 A  *  1/2002    ......... H03F 3/3094

OTHER PUBLICATIONS

Hayward Pool Products, "160 & 320 ColorLogic and CrystaLogic 1.5" LED Lights—LED Light Fixtures", Owner's Manual, RevF 092532, Hayward Pool Products, 2019, 28 pages.
Pentair, "Intellibrite 5G White and Color Pool and Spa Lights", www.pentair.com, Installation and User's Guide, 2019, 97 pages.

*Primary Examiner* — Thai Pham
(74) *Attorney, Agent, or Firm* — Slater Matsil, LLP

(57) ABSTRACT

A method for wirelessly providing power to a LED includes: receiving an AC input voltage having a first frequency via a cable; generating a first rectified voltage at a first node from the AC input voltage, the first node coupled to a first filtering non-electrolytic capacitor; powering a driver with the first rectified voltage; wirelessly transmitting power by driving a first resonant tank with the driver with a driving voltage at a second frequency higher than the first frequency, the driving voltage having a sinusoidal envelope at the first frequency and approximating a square-wave at the second frequency; receiving the wirelessly transmitted power with a second resonant tank; generating a second rectified voltage at second node from a voltage across the second resonant tank, the second node coupled to a second filtering capacitor; generating a DC voltage from the second rectified voltage; and powering the LED with the DC voltage.

21 Claims, 22 Drawing Sheets

(51) Int. Cl.
*H02J 50/12* (2016.01)
*H05B 45/38* (2020.01)
*F21V 23/00* (2015.01)
*H01F 38/14* (2006.01)
*H05B 45/355* (2020.01)
*F21W 131/401* (2006.01)
*F21Y 115/10* (2016.01)

(52) U.S. Cl.
CPC ........... *H05B 45/355* (2020.01); *H05B 45/38* (2020.01); *F21W 2131/401* (2013.01); *F21Y 2115/10* (2016.08)

(58) Field of Classification Search
CPC .. H05B 45/355; H05B 45/37; H05B 45/3725; H05B 45/38; H05B 45/39
See application file for complete search history.

(56) References Cited

U.S. PATENT DOCUMENTS

| | | | |
|---|---|---|---|
| 7,244,037 B2 | 7/2007 | Koren | |
| 9,247,595 B2* | 1/2016 | Fornage | H05B 45/382 |
| 10,473,273 B1* | 11/2019 | Zolotykh | F21K 9/90 |
| 10,714,976 B2* | 7/2020 | Uchimoto | H02J 50/90 |
| 10,983,153 B1* | 4/2021 | Forood | G08B 21/082 |
| 11,199,715 B2* | 12/2021 | Van Heugten | G02C 7/04 |
| 2014/0191568 A1* | 7/2014 | Partovi | H02M 3/33515 |
| | | | 307/31 |
| 2017/0077837 A1* | 3/2017 | Gu | H02M 1/15 |
| 2018/0166881 A1* | 6/2018 | Suryanarayana | H02H 7/268 |
| 2018/0226938 A1* | 8/2018 | Kuisma | H03H 9/2405 |
| 2019/0329653 A1* | 10/2019 | Ueta | H02J 50/10 |

* cited by examiner

PRIOR ART

PRIOR ART

Perspective view

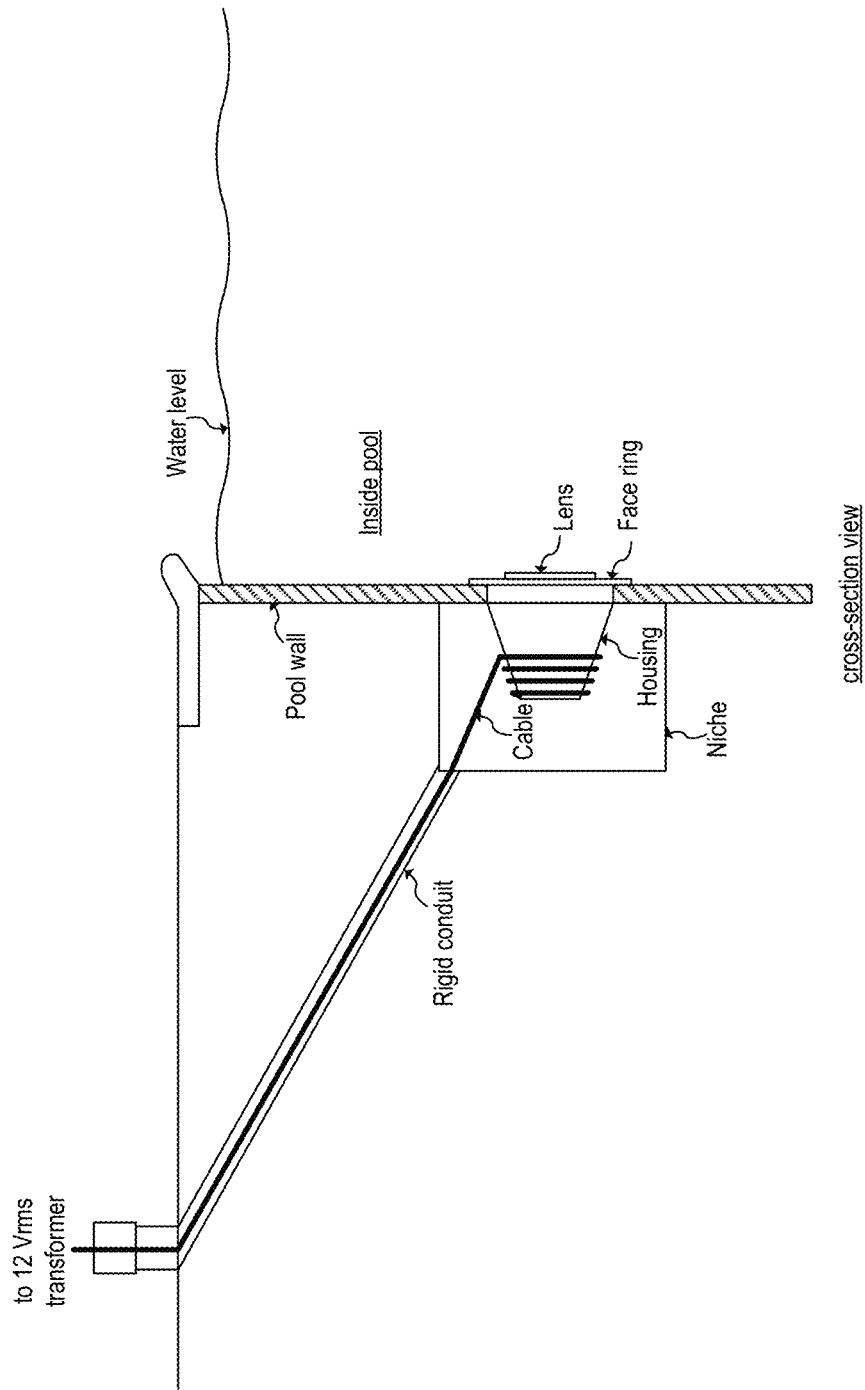

PRIOR ART perspective view side view side view top, cross-sectional view

Water of pool top, cross-sectional view top, cross-sectional view top, cross-sectional view perspective view

WIRELESS POWER TRANSFER METHOD, CIRCUIT AND APPARATUS

TECHNICAL FIELD

The present disclosure relates generally to an electronic system and method, and, in particular embodiments, to a wireless power transfer method, circuit, and apparatus.

BACKGROUND

Conventional pool lights are installed within a wall of the pool. The light producing element may be an incandescent bulb, a halogen bulb, or a light emitting diode (LED) for example.

Pool lights are conventionally powered with AC power flowing through a cable that is coupled between the pool light and a transformer, where at least a portion of the cable is disposed inside the pool wall.

There are two types of popular pool lights. A conventional pool light is installed in a pool light niche. An accent light is installed inside a PVC pipe within the pool wall.

FIGS. 1A-1D show different view of a conventional pool light for niche installation. As shown, the pool light includes a light housing having a cable for receiving AC power on one side, and the lens on the other side. The light housing also includes a printed circuit board (PCB) for receiving the AC power from the cable, and for powering the light element.

FIG. 1E illustrates an exemplary installation of the pool light of FIGS. 1A-1D in a pool. As shown, the pool light is installed in a niche of the pool. The cable goes from the housing of the pool light to the transformer inside a rigid conduit, such as a PVC pipe.

FIGS. 2A and 2B show different view of a conventional accent pool light. As shown, the accent pool light also includes a light housing having a cable for receiving AC power on one side, and the lens on the other side. The light housing also includes a PCB (not shown) for receiving the AC power from the cable, and for powering the light element, which is typically one or more LEDs. The housing of the accent light is filled with epoxy to prevent water damage.

FIGS. 2C-2E illustrate an exemplary installation of the accent pool light of FIGS. 2A and 2B in a pool. As shown, the accent pool light is installed inside a PVC pipe. The cable goes from the housing of the accent pool light to the transformer inside a rigid conduit, such as a PVC pipe.

FIG. 3 illustrates an exemplary wiring from N pool lights to the transformer. The pool light may be, e.g., conventional pool lights installed in respective niches, and/or accent lights.

As shown in FIG. 3, the cable from each pool light is coupled to a respective junction box. A transformer receives power from mains (e.g., through a switch) and powers the junction boxes in parallel with AC power, as shown in FIG. 3.

SUMMARY

In accordance with an embodiment, a method for wirelessly providing power to an underwater light emitting diode (LED) includes: receiving, with a wireless power transmitter, an input voltage via a cable, the input voltage being an alternate current (AC) voltage and having a first frequency; rectifying the input voltage with a first rectifier to generate a first rectified voltage at an output of the first rectifier, where a first filtering capacitor is coupled to the output of the first rectifier, the first filtering capacitor being a non-electrolytic capacitor; powering a driver with the first rectified voltage, the driver having an output coupled to a first resonant tank that includes a transmitting coil; wirelessly transmitting power by driving the first resonant tank with the driver with a driving voltage at a second frequency that is higher than the first frequency, where the driving voltage has a sinusoidal envelope at the first frequency and approximates a square-wave at the second frequency; receiving the wirelessly transmitted power with a second resonant tank of a wireless power receiver to generate a receiver voltage, the second resonant tank including a receiving coil; rectifying the receiver voltage with a second rectifier to generate a second rectified voltage at an output of the second rectifier, where a second filtering capacitor is coupled to the output of the second rectifier; generating a direct current (DC) voltage from the second rectified voltage with a switched-mode power supply (SMPS); and powering the LED with the DC voltage.

In accordance with an embodiment, a device includes: a wireless power transmitter housing including: a first PCB coupled to a cable for receiving an input voltage, the input voltage being an alternate current (AC) voltage and having a first frequency, a hollow cylinder, a first ferrite disc disposed between the first PCB and the hollow cylinder, and a transmitting coil disposed at an inner surface of the hollow cylinder; and a light housing including: a wireless power receiver including: a center rod disposed inside the hollow cylinder, a second PCB, a second ferrite disc disposed between the center rod and the second PCB, and a receiving coil surrounding the center rod, and one or more light emitting diodes (LED) coupled to the wireless power receiver.

In accordance with an embodiment, a device includes: a wireless power transmitter having an input terminal configured to receive an input voltage via a cable, the input voltage being of an alternate current (AC) type and having a first frequency, the wireless power transmitter including: a transmitting coil, a rectifier having an input coupled to the input terminal, the rectifier configured to generate a first rectified voltage at a first node, a first filtering capacitor coupled to the first node, and a driver configured to drive the transmitting coil with a driving voltage at a second frequency to wirelessly transmit power, the second frequency being higher than the first frequency, where the driving voltage has a sinusoidal envelope at the first frequency and approximates a square-wave at the second frequency.

BRIEF DESCRIPTION OF THE DRAWINGS

For a more complete understanding of the present invention, and the advantages thereof, reference is now made to the following descriptions taken in conjunction with the accompanying drawings, in which:

FIG. 1E illustrates an exemplary installation of the pool light of FIGS. 1A-1D in a pool;

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1B:
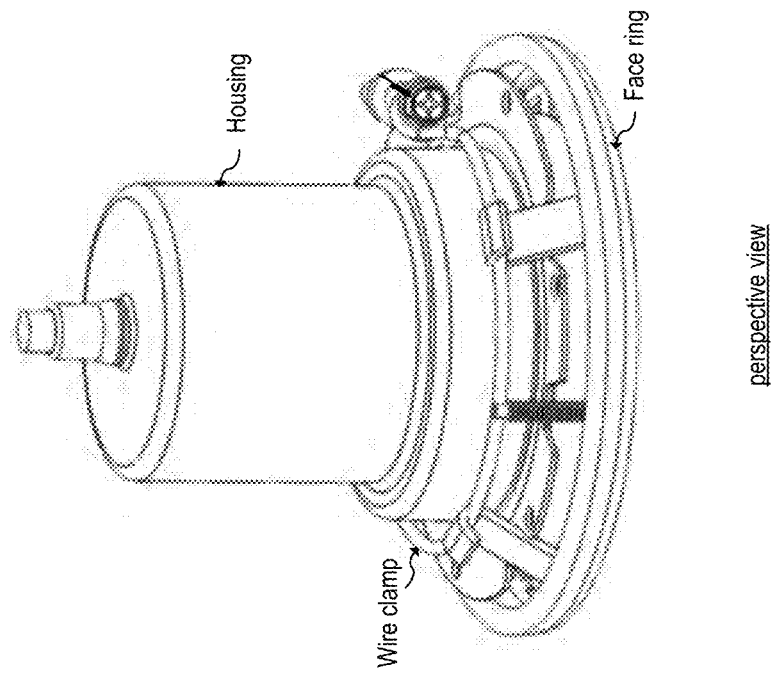
FIGS. 1A-1D show different view of a conventional pool light for niche installation.
Figure 1A:
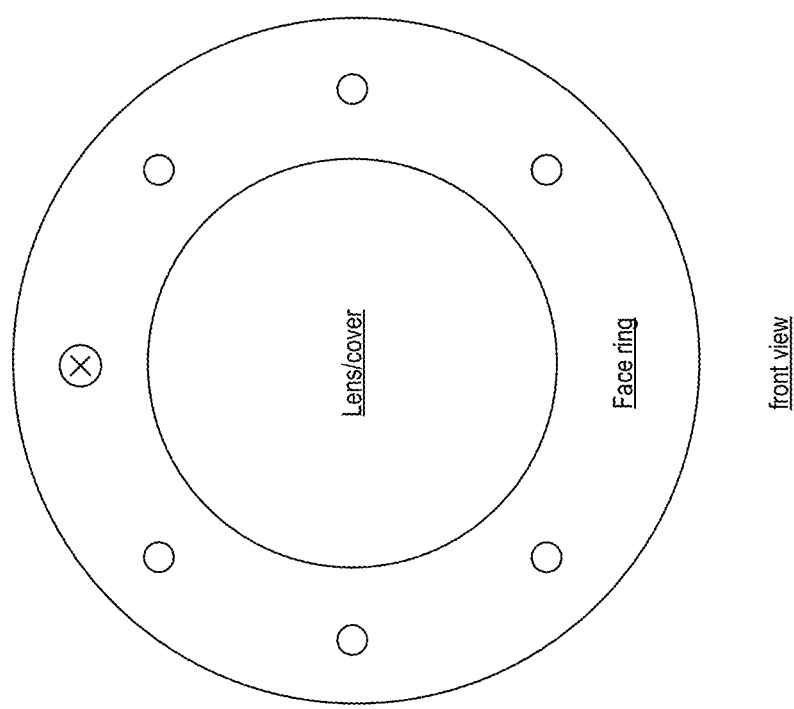
Figure 1C:
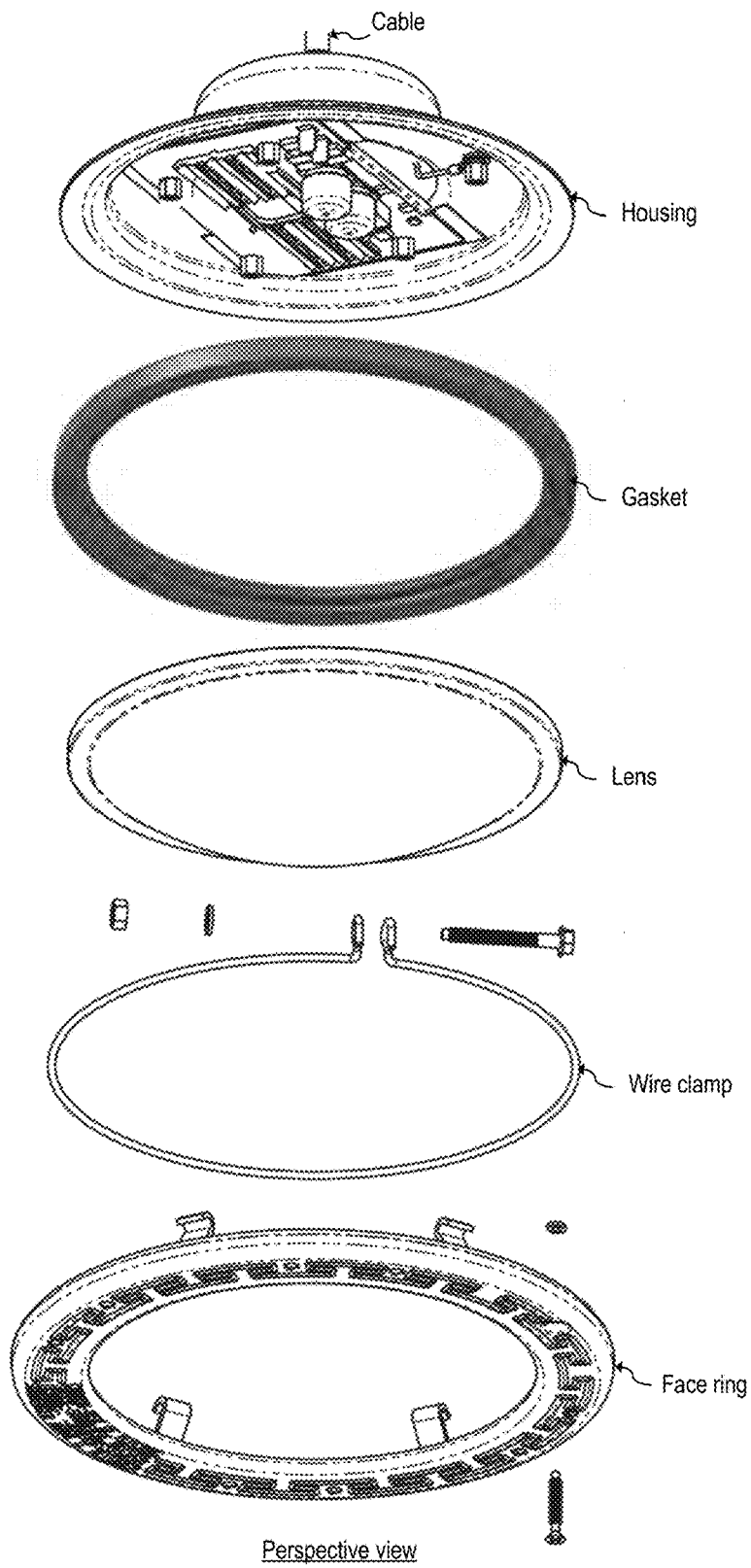
Figure 1D:
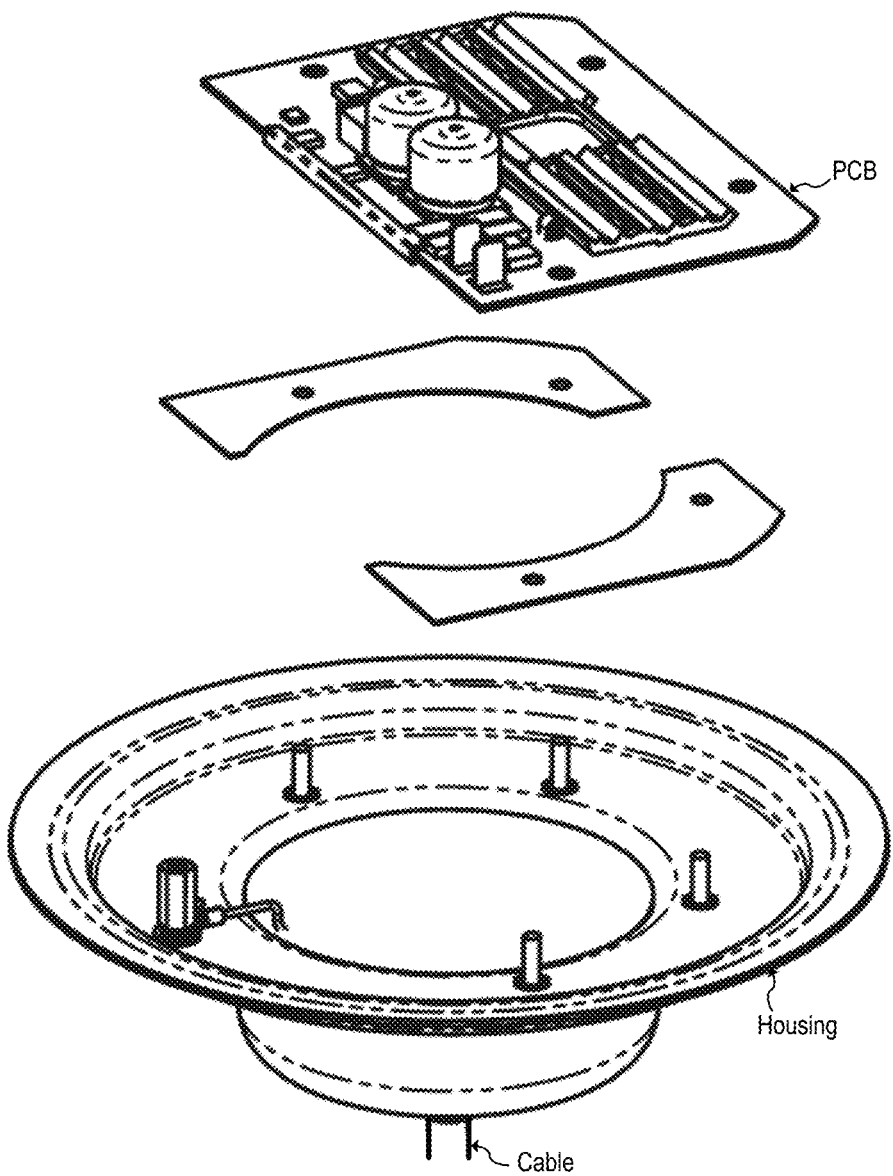

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, wireless power transfer for in-ground pool lights. Embodiments of the present invention may be used for lighting in other types of underwater or water-exposed applications, such as spas, as well as other intrinsically safe (IS) applications. Some embodiments may be used for lighting in applications exposed to substances other than water. For example, some embodiments may be used in flammable gas-exposed applications. Some embodiments may be used for loads different from lights, such as sensors, and/or motors, for example.

In an embodiment of the present invention, a wireless power transmitter is used to power an underwater LED-based pool light. The wireless power transmitter and the LED-based pool light can be installed in a niche of a pool wall or inside a PVC pipe within the pool wall. Since the LED-based pool light receives power wirelessly, the water-tight enclosure enclosing the LED-based pool light does not have any openings for receiving power via a cable. Thus, some embodiments advantageously reduce the risk of leakage of water into the LED-based pool light.

In an embodiment of the present invention, the wireless power transmitter receives AC power from a cable and transmits wireless power to the LED-based pool light. The wireless power transmitter is implemented without electrolytic capacitors, thereby advantageously increasing the lifespan of the wireless power transmitter. In some embodiments, a power factor correction scheme is implemented such that the load, as seen by a transformer receiving power from mains and powering the wireless power transmitter, looks like a resistor, thereby advantageously increasing efficiency.

In an embodiment of the present invention, the wireless power transmitter includes a microcontroller capable of detecting, via the cable, a command for controlling the LED-based pool light, and communicating such command to the LED-based pool light using an in-band communication protocol. In some embodiments, an out-of-band communication protocol, such as Bluetooth or WiFi, may also be used.

In an embodiment of the present invention, the wireless power transmitter and the LED-based light are located inside a PVC pipe within a pool wall or in a niche of the pool wall. The LED-based pool light is latched to the wireless power transmitter by screwing the LED-based pool light into the enclosure of the wireless power transmitter or by using a locking pin, for example. Since the pool light is not permanently attached to the wireless power transmitter, the pool light may be detached and replaced without having to replace the wireless power transmitter.

Figure 2A:
FIGS. 2A and 2B show different view of a conventional accent pool light.
Figure 2B:
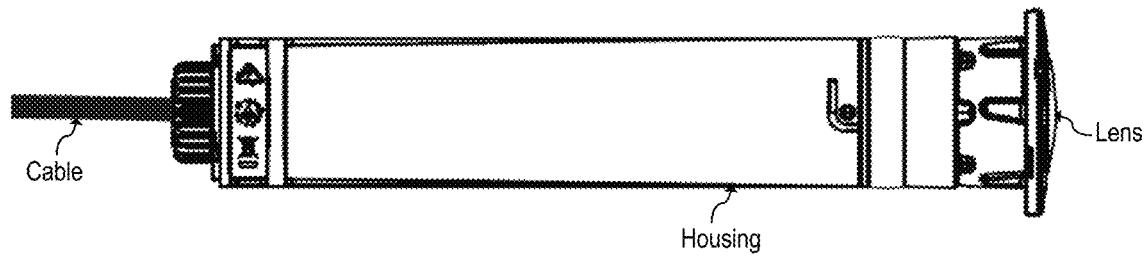
Figure 2C:
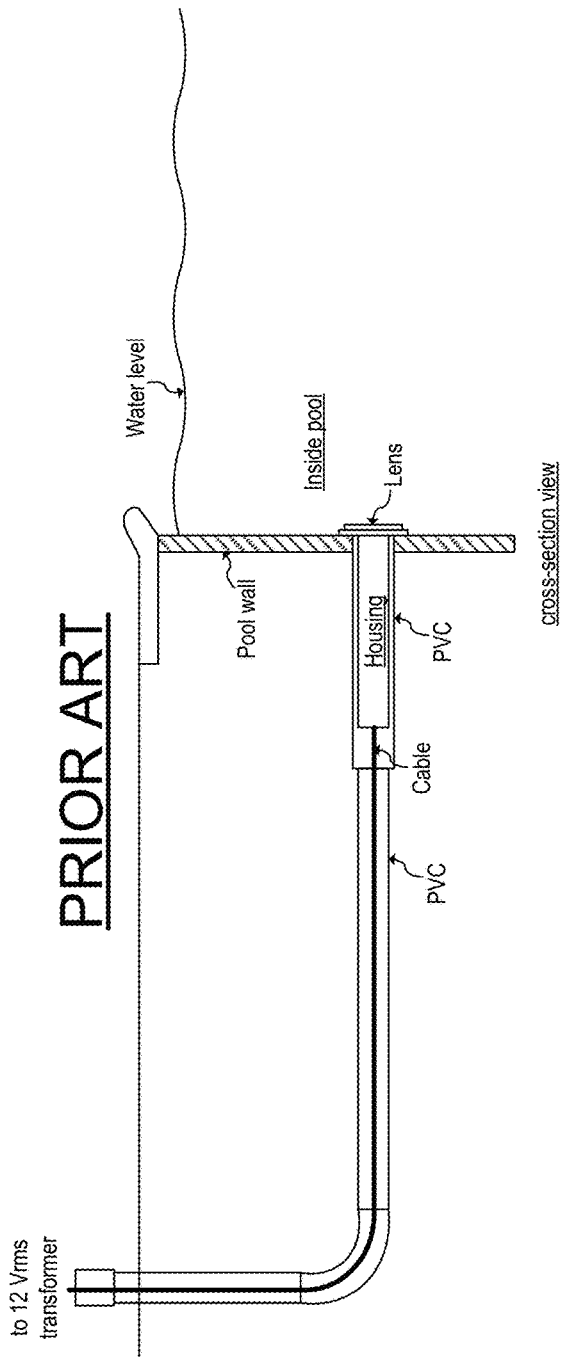
FIGS. 2C-2E illustrate an exemplary installation of the accent pool light of FIGS. 2A and 2B in a pool.
Figure 2E:
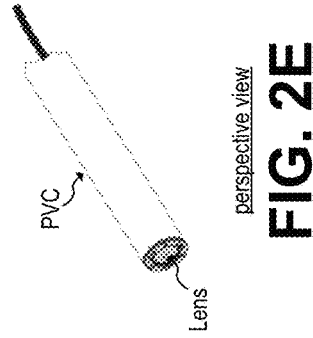
Figure 2D:
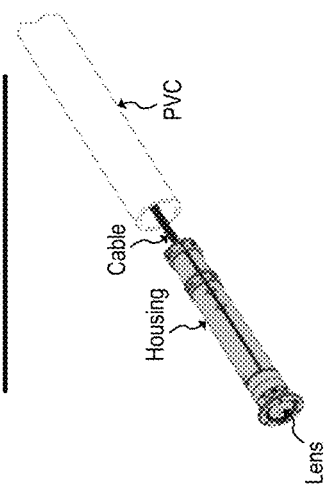

As shown in FIGS. 1E and 2C, conventional pool lights are generally installed in a niche of a pool wall or in a PVC pipe within the pool wall. The pool light generally receives a cable from a transformer that produces, e.g., a 12 Vrms of AC power (at, e.g., 60 Hz).

Some modern pool lights are implemented with light emitting diodes (LEDs). The use of LEDs is advantageous, in part, because LEDs tend to have a longer lifespan than conventional incandescent or halogen bulbs. However, since LED's generate light based on the current flow, electrolytic capacitors are generally used to provide constant or near constant power to the LED, thereby advantageously avoiding the flickering that would be observed, e.g., at 120 Hz of the rectified AC signal of, e.g., 12 Vrms. Electrolytic capacitors are used instead of other types of capacitors (such as ceramic capacitors) because, generally, other types of capacitor technologies (such as ceramic capacitors) cannot, in a practical application, provide the amount of power needed (e.g., don't have the capacitance and/or voltage rating) to power a LED light of, e.g., 10 W to 60 W, to avoid flickering at 120 Hz.

Although LEDs tend to have a relatively long lifespan (e.g., greater than 10 or 15 years), electrolytic capacitors generally fail earlier, e.g., within 5 years of use. Therefore, conventional underwater LED-based pool lights may not exhibit a significant increase in lifespan when compared to incandescent or halogen-based pool lights.

Although it is possible to avoid the use of electrolytic capacitors, and thus, increase the lifespan of the LED-based pool light by transmitting DC power over the cable (e.g., a 12 V DC signal) instead of the AC signal (e.g., 12 Vrms, at 60 Hz, which is then rectified to produce a 120 Hz rectified signal), the use of DC power in underwater applications is disfavored. For example, if part of the cable (from the transformer to the LED-based pool light) carrying DC power is exposed to a liquid, electrolysis may happen, which may consume the metal of the cable over time. Additionally, DC power has been found to be more damaging to a human muscle than AC power. Therefore, it is generally required for the cable powering the pool light to carry AC power, which generally has the same frequency as mains (e.g., 60 Hz in the U.S., 50 Hz in Europe), and generally has a voltage lower than mains (e.g., 12 Vrms).

Conventional LED-based pool lights are generally fully sealed and watertight (such as shown in FIGS. 1A-1E and 2A-2E, for example). Since the pool light is fully sealed, the cable generally cannot be detached from the pool light. Thus, replacing a conventional pool light generally requires removing the cable that runs from the pool light, through the pool wall and towards the transformer producing the 12 Vrms of AC power. In some cases, the cable can be as long as 150 feet, or longer, for example.

Replacing a conventional pool light, thus, may entail significant effort, e.g., since a new cable (with the replacement pool light attached) generally has to be run, e.g., from the pool light, through the pool wall and towards the transformer producing the 12 Vrms of AC power. The labor costs associated with running the new cable usually exceed the cost of the pool light itself.

In an embodiment of the present invention, a wireless power transmitter is installed in the niche or PVC pipe inside a pool wall and is connected via a cable carrying AC power (e.g., 60 Hz, 12 Vrms) to a transformer that is coupled to mains. The wireless power transmitter wirelessly transmits power to a wireless power receiver that powers an underwater LED-based pool light. The wireless power transmitter advantageously avoids the use of electrolytic capacitors by converting received AC power (e.g., at 60 Hz, 120 Vrms) into AC power at higher frequency (e.g., at 100 kHz). By avoiding the use of electrolytic capacitors in the wireless power transmitter, the lifespan of the wireless power transmitter (which is connected to the transformer producing the 12 Vrms of AC power via the cable through the wall of the pool) is extended well beyond the lifespan of a conventional pool light. The LED-based light is advantageously detachable from the wireless power transmitter (since power is received wirelessly), and thus, can advantageously be replaced without having to run a new cable.

Figure 4:
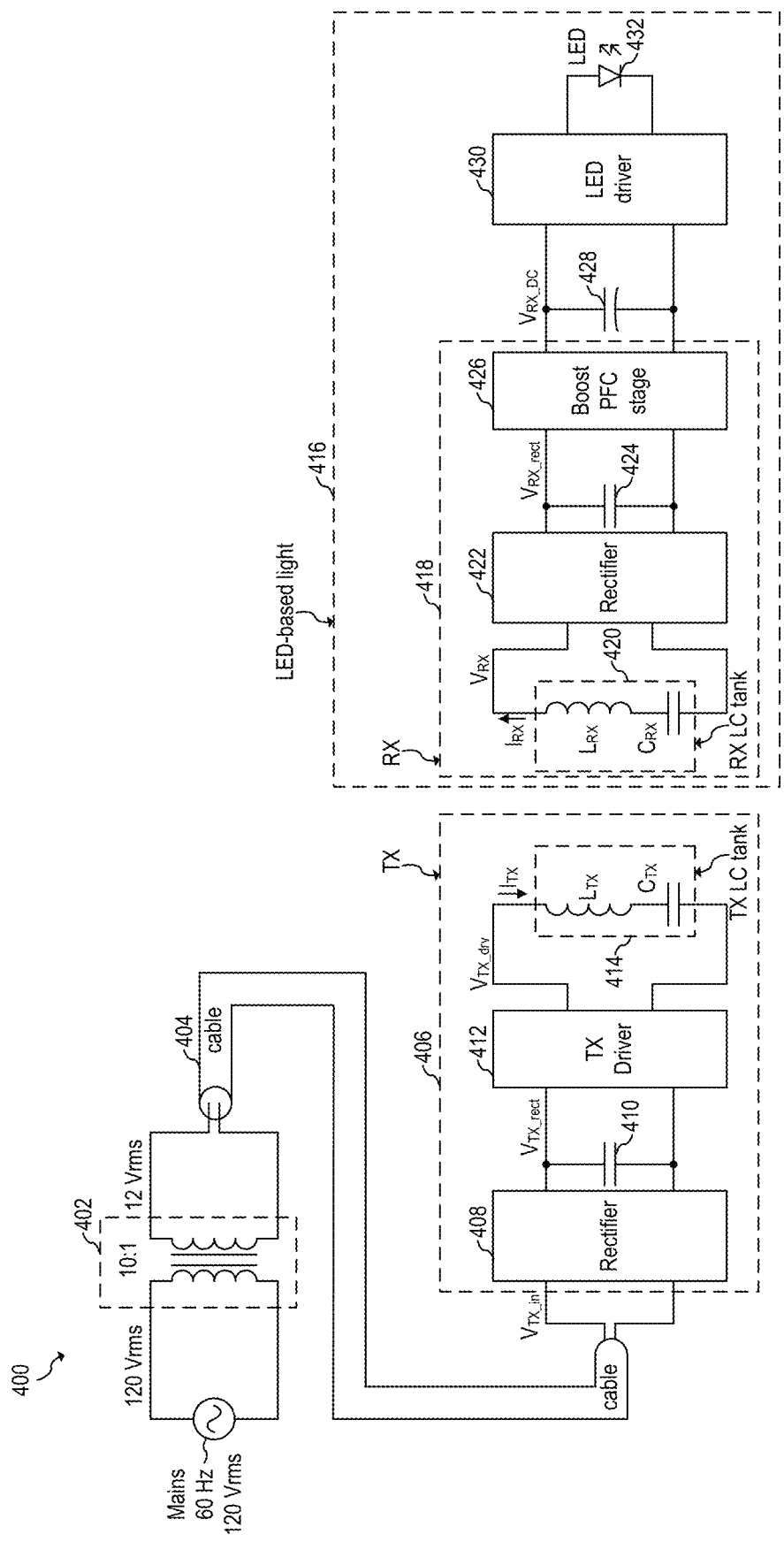
FIG. 4 shows a schematic diagram of a wireless power transmission-based system for pool lighting, according to an embodiment of the present invention.

FIG. 4 shows a schematic diagram of wireless power transmission-based system 400 for pool lighting, according to an embodiment of the present invention. System 400 includes transformer 402, cable 404, wireless power transmitter 406, and LED-based light 416. Wireless power transmitter 406 includes rectifier 408, driver 412, filtering capacitor 410, and LC tank 414. LC tank 414 includes transmitting coil $L_{TX}$ and resonant capacitor $C_{TX}$. LED-based light 416 includes wireless power receiver 418, electrolytic capacitor 428, LED driver 430, and LED 432. Wireless power receiver 418 includes LC tank 420, rectifier 422, filtering capacitor 424, and boost PFC stage 426. LC tank 420 includes receiving coil $L_{RX}$ and resonant capacitor $C_{RX}$.

As shown in FIG. 4, transformer 402 receives power from mains (e.g., 120 Vrms at 60 Hz in U.S.; 230 Vrms at 50 Hz in Europe), and generates an AC voltage that is lower than mains (e.g., 12 Vrms) and has the same frequency as mains. Transformer 402 advantageously provides galvanic isolation from mains.

Wireless power transmitter 406 is located, e.g., within a pool wall (e.g., inside a niche or PVC pipe) and is connected to cable 404 for receiving AC power. The input voltage $V_{TX\_in}$ received by wireless power transmitter 406 (e.g., 12 Vrms at 60 Hz) is rectified, by rectifier 408 to generate rectified voltage $V_{TX\_rect}$. Rectifier voltage $V_{TX\_rect}$ has a frequency that is twice the mains frequency (e.g., 120 Hz). The rectified voltage $V_{TX\_rect}$ is used by the driver 412 to generate a driving voltage $V_{TX\_drv}$ dry across the LC tank 414 at a frequency substantially higher than the frequency of the rectified voltage $V_{TX\_rect}$, such as at 100 kHz, for example.

LED-based light 416 is attached or disposed proximate (physically close) to wireless power transmitter 406 (e.g., inside the niche or PVC pipe), e.g., so that receiving coil $L_{RX}$ is magnetically coupled to transmitting coil $L_{TX}$. For example, in some embodiments, receiving coil $L_{RX}$ is 25 mm of distance or less (such as 5 mm or less) from transmitting coil $L_{TX}$. In some embodiments, wireless power transmitter 406 and the LED-based light 416 are mechanically latched, e.g., using threads and/or a locking pin. Other locking mechanisms may also be used, such as using screws or a twist and lock mechanism.

During wireless power transmission, driver 412 switches (e.g., at 100 kHz) to create AC current $I_{TX}$, which flows through LC tank 414. The magnetic energy generated from transmitting coil $L_{TX}$ coupled with receiving coil $L_{RX}$, thereby causing current $I_{RX}$ to flow in LC tank 420, which produces voltage $V_{RX}$. The voltage $V_{RX}$ is rectified by rectifier 422 to produce rectified voltage $V_{RX\_rect}$. A switched-mode power supply (SMPS), such as boost converter with power factor correction (PFC) 426 is used to generate a DC voltage $V_{RX\_DC}$ (or approximately a DC voltage) for powering LED driver 430, which powers LED 432 for illuminating the pool.

FIG. 4 shows mains having 120 Vrms at 60 Hz. It is understood that mains with other voltages (e.g., 240 Vrms) and/or frequencies (e.g., 50 Hz), may also be used.

Figure 3:
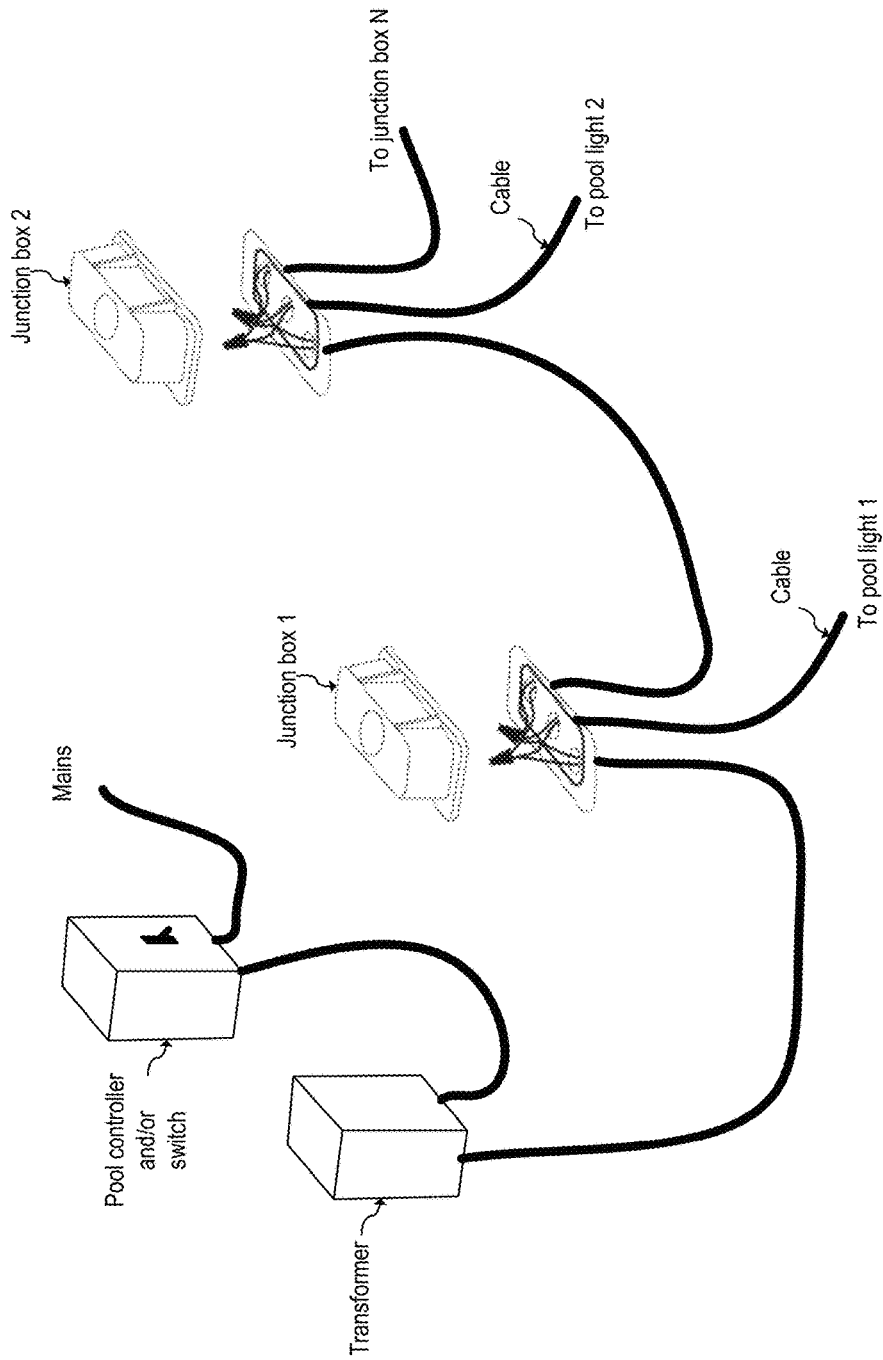
FIG. 3 illustrates an exemplary wiring from a plurality of pool lights to the transformer.

Transformer 402 may be implemented in any way known in the art. For example, transformer 402 may be implemented (e.g., as shown in FIG. 4) with a 10:1 ratio for producing a 12 Vrms from a 120 Vrms mains. Transformer with other ratio and/or producing different AC voltages may also be used. In some embodiments, transformer 402 is implemented, e.g., as shown in FIG. 3. Other implementations are also possible.

Cable 404 is coupled between transformer 402 and wireless power transmitter 406. Cable 404 may be implemented in any way known in the art and may be installed, e.g., in a similar manner as shown in FIGS. 1A-1E, FIGS. 2A-2E, and/or FIG. 3.

Wireless power transmitter 406 is configured to wirelessly transmit power to LED-based light 416.

Rectifier 408 is configured to rectify AC voltage $V_{TX\_in}$ into rectifier voltage $V_{TX\_rect}$. Rectifier 408 may be implemented in any way known in the art. For example, in some embodiments, rectifier 408 is implemented as a full-wave rectifier using a diode bridge (passive rectification). In other embodiments, rectifier 408 is implemented as a synchronous rectifier (active rectification).

Driver 412 is configured to generate driving voltage $V_{TX\_drv}$ to cause current $I_{TX}$ to flow through LC tank 414. In some embodiments, driver 412 is implemented with a full-bridge operating, e.g., at 100 kHz. Other frequencies, such as any frequency between 80 kHz and 300 kHz, may also be used. Other implementations are also possible.

LC tanks 414 and 420 may also be referred to as resonant tanks. In some embodiments, LC tanks 414 and 420 have identical resonant frequencies (e.g., at or near 100 kHz). In other embodiments, the resonant frequencies of LC tanks 414 and 420 may be different.

Transmitting coil $L_{TX}$ may be implemented with Litz wire, or as a flat coil. Other implementations are also possible. In some embodiments, driver 412 may drive more than one transmitting coil $L_{TX}$.

Receiving coil $L_{RX}$ may be implemented with Litz wire, or as a flat coil. Other implementations are also possible. In some embodiments, more than one receiving coil $L_{RX}$ may be used.

LED-based light 416, which includes wireless power receiver 418, LED driver 430 and LED 432, is located near wireless power transmitter 406. For example, in some embodiments, LED-based light 416 is implemented inside a conventional housing and/or enclosure, such as the enclosures shown in FIGS. 1A-1E, and FIGS. 2A-2E. Other implementations are also possible.

Rectifier 422 is configured to rectify voltage $V_{RX}$ into rectifier voltage $V_{RX\_rect}$. Rectifier 422 may be implemented in any way known in the art. For example, in some embodiments, rectifier 422 is implemented as a full-wave rectifier using a diode bridge (passive rectification). In other embodiments, rectifier 422 is implemented as a synchronous rectifier (active rectification).

As described below in more detail, rectified voltage $V_{RX\_rect}$ is an AC voltage. Boost PFC stage 426 is configured to generate a boosted DC voltage $V_{RX\_DC}$ from voltage $V_{RX\_rect}$ and perform power factor correction. Boost PFC stage 426 may be implemented, e.g., as an SMPS. In some embodiments, SMPS 426 may be implemented as a buck converter to step-down the voltage from voltage $V_{RX\_rect}$. In some embodiments, converter 426 may be implemented as a buck-boost. Some embodiments may not implement power factor correction. Other implementations are also possible.

LED driver 430 is configured to drive LED 432. In some embodiments LED driver 430 may drive a plurality of LEDs (e.g., of a single or different colors). In some embodiments, wireless power receiver 418 may power more than one LED driver 430, where each of the more than LED drivers 430 power one or more LEDs 432 (which may be of the same or different color).

LED driver 430 may be implemented in any way known in the art. For example, in some embodiments, LED driver 430 may be implemented as a constant current switched-mode power supply. Other implementations are also possible.

Figure 5A:
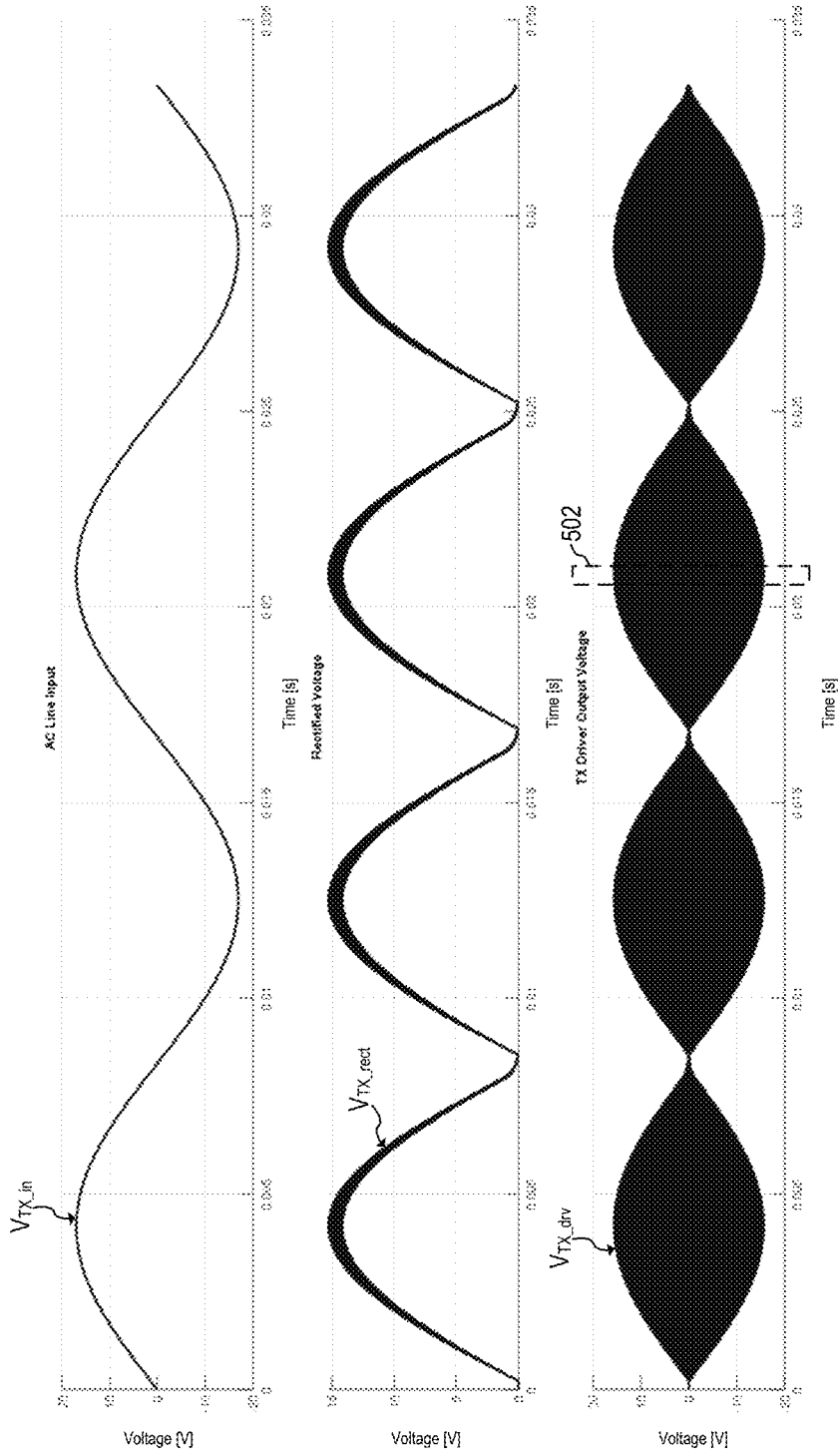
FIGS. 5A and 5B show waveforms associated with the wireless power transmitter of FIG. 4, according to an embodiment of the present invention.
Figure 5B:
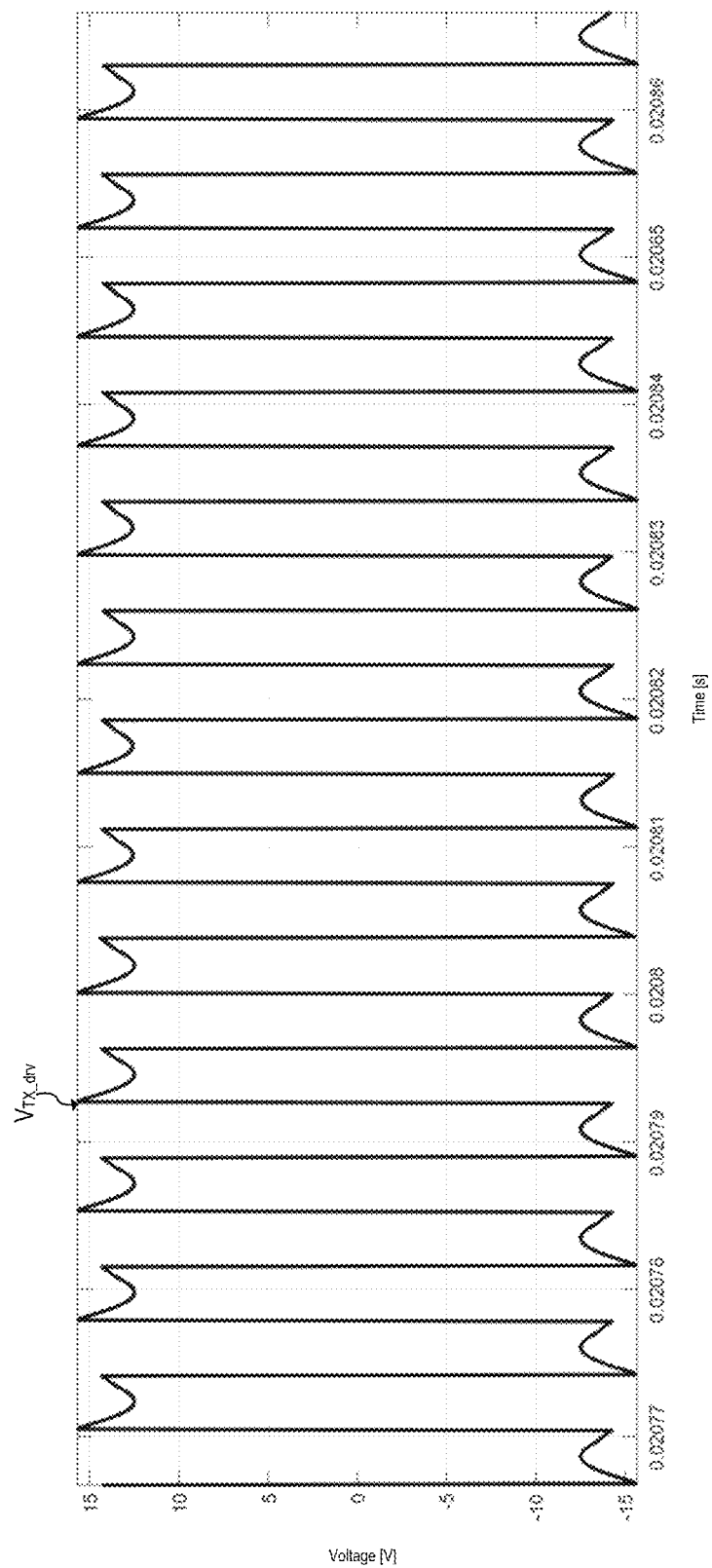

FIGS. 5A and 5B show waveforms associated with wireless power transmitter 406, according to an embodiment of the present invention. FIG. 5A shows waveforms of input voltage $V_{TX\_in}$, rectified voltage $V_{TX\_rect}$, and driving voltage $V_{TX\_drv}$. FIG. 5B shows a zoomed-in waveform of driving voltage $V_{TX\_drv}$ in the region 502.

As shown in FIG. 5A, rectified voltage $V_{RX\_rect}$ has a rectified envelope at 120 Hz that reaches 0 V, or near 0 V (e.g., lower than 5% of the peak voltage) at 120 Hz. As can be seen in FIG. 5A, filtering capacitor 410 is small and does not filter the 120 Hz signal (e.g., does not create an envelope with a small ripple so that the 120 Hz signal can be viewed as approximating a DC voltage). However, as shown in FIG. 5B filtering capacitor 410 is big enough to store energy for the high frequency of the AC signal used to exercise LC tank 414 for wireless power transmission, thereby resulting in a driving voltage $V_{TX\_drv}$ that approximates a square-wave in each high frequency (e.g., 100 kHz) switching cycle, and that has a sinusoidal envelope at the low frequency (e.g., 120 Hz). A voltage may be considered a square-wave if the ripple at the peaks is lower than, e.g., 10% of the maximum voltage. In some embodiments, the maximum ripple allowed for the square-wave may be higher than 10%, such as 15% or higher, or lower than 10%, such as 5%, 1%, or lower.

In some embodiments, filtering capacitor 410 has a value between 1 µF and 100 µF and is implemented, e.g., with a ceramic capacitor. In some embodiments, filtering capacitor 410 has a low ESR (e.g., 0.1Ω) at the switching frequency of driving voltage $V_{TX\_drv}$ (e.g., 100 kHz). By avoiding the use of an electrolytic capacitor, which is made possible, in part, by the relatively low capacitance for high frequency energy storage and by avoiding filtering the low frequency of the input voltage $V_{TX\_in}$ (which has, e.g., the same frequency as mains), some embodiments achieve long lifespan for wireless power transmitter 406, which may be, e.g., 10 years or longer.

Figure 6A:
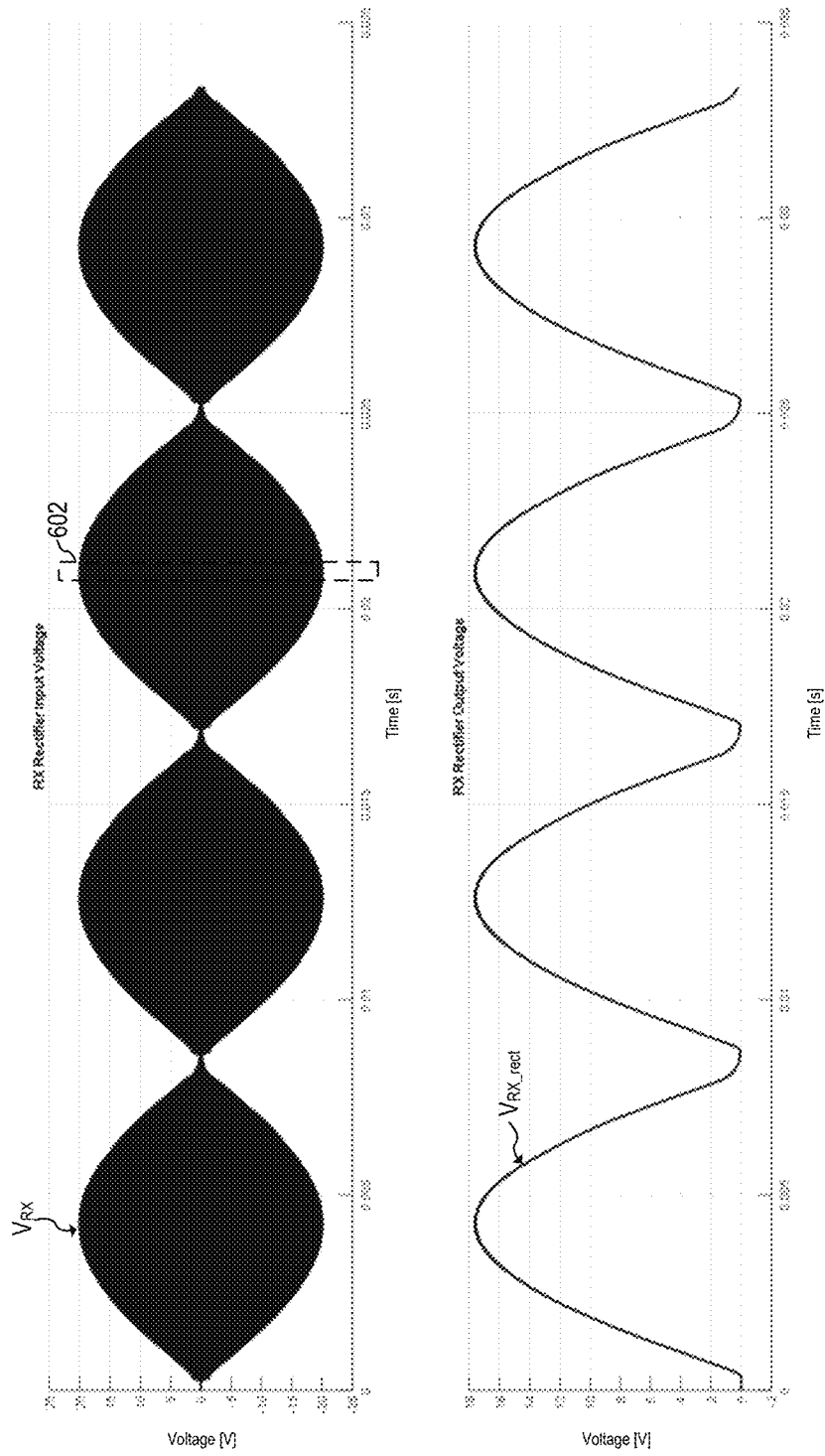
FIGS. 6A and 6B show waveforms associated with the wireless power receiver of FIG. 4, according to an embodiment of the present invention.
Figure 6B:
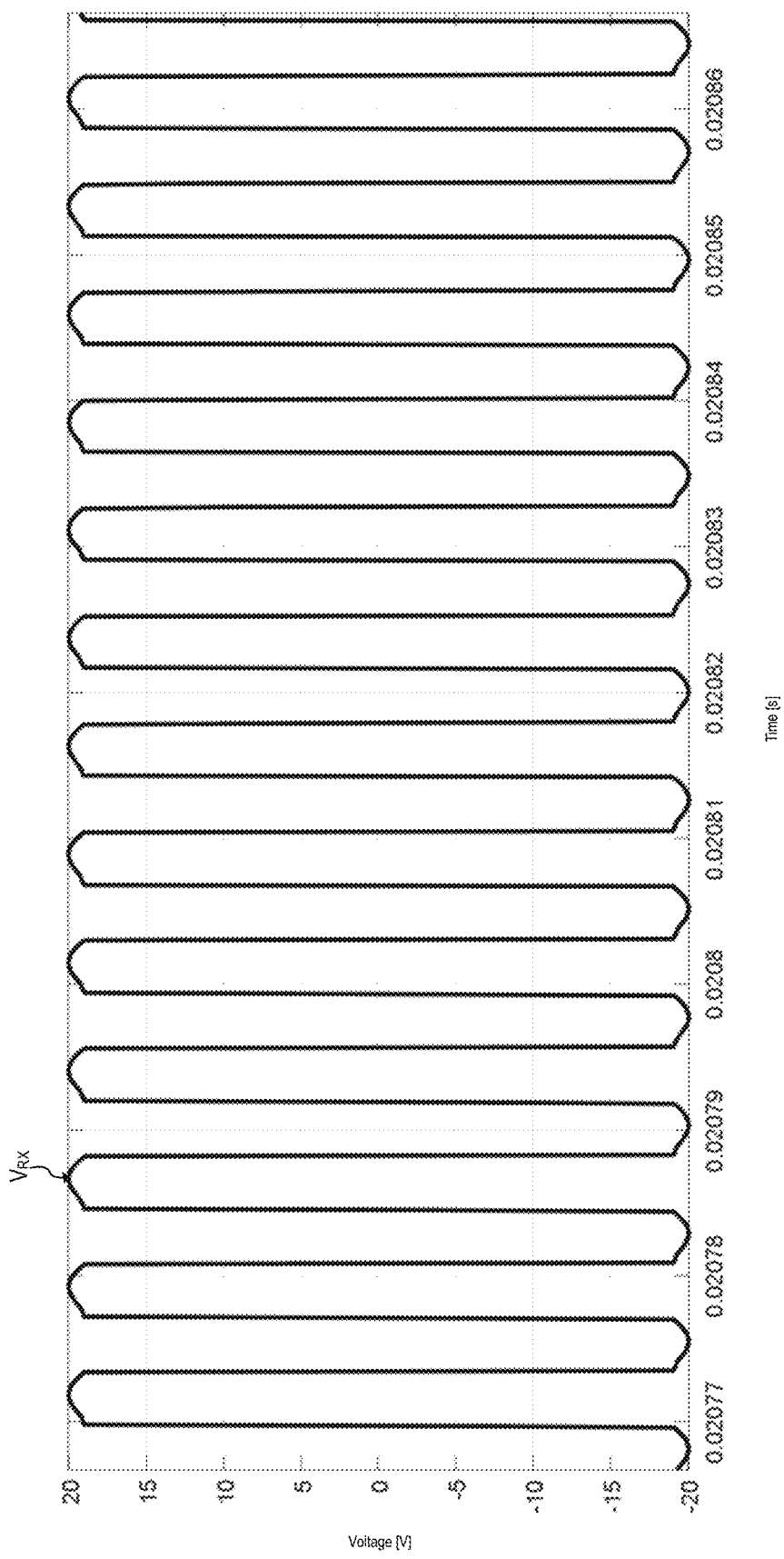

FIGS. 6A and 6B show waveforms associated with wireless power receiver 418, according to an embodiment of the present invention. FIG. 6A shows waveforms of voltage $V_{RX}$, and rectified voltage $V_{RX\_rect}$. FIG. 6B shows a zoomed-in waveform of voltage $V_{RX}$ in the region 602.

As shown in FIGS. 6A and 6B, the output of LC tank 420 (the voltage $V_{RX}$ across LC tank 420) has a low frequency component (e.g., at the twice the mains frequency, such as 120 Hz), and a high frequency components (e.g., at the switching frequency of driving signal $V_{TX\_drv}$, such as 100 kHz). As also shown in FIG. 6A, rectified voltage $V_{RX\_rect}$ has a rectified envelope at, e.g., 120 Hz that reaches 0 V, or near 0 V at 120 Hz, but does not have the high frequency component (e.g., 100 kHz). The filtering of the high frequency component is made possible, in part, by filtering capacitor 424. Filtering capacitor 424 is small and does not filter the 120 Hz signal (e.g., does not create an envelope with a small ripple so that the 120 Hz signal can be viewed as approximating a DC voltage). However, filtering capacitor 424 is big enough for high frequency (e.g., 100 kHz) energy storage.

In some embodiments, filtering capacitor 424 has a value between 10 µF and 100 µF and is implemented, e.g., with a ceramic capacitor. In some embodiments, having filtering capacitor 424 with relatively low capacitance advantageously allows rectifier 422 to conduct current for a long time (for most of the duration of the 120 Hz cycle, such as for more than 75% of the 120 Hz cycle, for example) with a relatively low current, instead of conducting current for a short period (e.g., for less than 10% of the 120 Hz cycle) with a large current, which would be the case if a large (e.g., electrolytic) capacitor is used (e.g., 1 mF or larger) instead of a relatively small (e.g., ceramic) capacitor (of, e.g., 1 µF to 100 µF).

In some embodiments, filtering capacitor 424 has a low ESR (e.g., 0.1Ω) at the switching frequency of driving voltage $V_{TX\_drv}$ (e.g., 100 kHz). In some embodiments, filtering capacitors 410 and 424 have the same capacitance value and are of the same type (e.g., ceramic capacitors).

Figure 7:
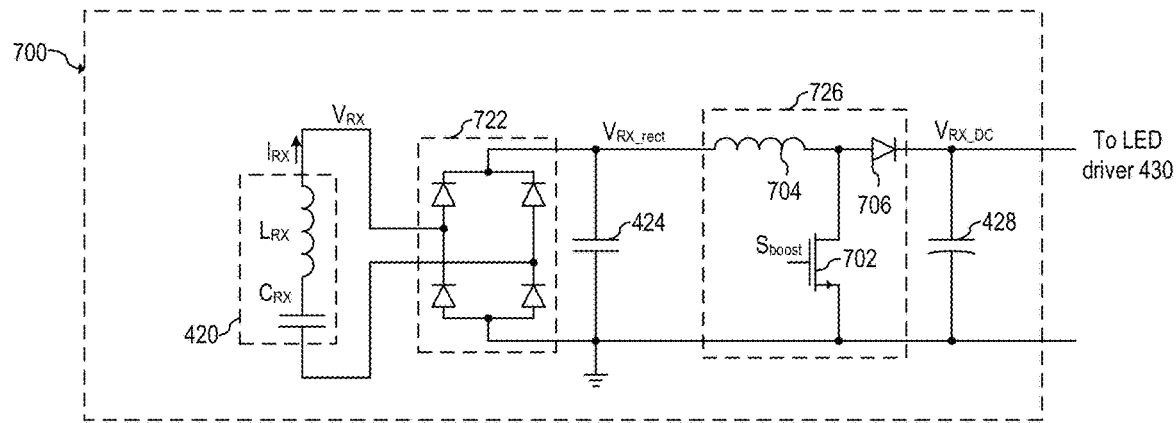
FIG. 7 shows a schematic diagram of the wireless power receiver of FIG. 4, according to an embodiment of the present invention.

FIG. 7 shows a schematic diagram of wireless power receiver 700, according to an embodiment of the present invention. Wireless power receiver 418 may be implemented as wireless power receiver 700. As shown in FIG. 7, rectifier 422 may be implemented with diode bridge 722 and power converter 426 may be implemented with boost converter 726, which is an SMPS of the boost type. It is understood that wireless power receiver 700 may be implemented with rectifier 422 and power converter 426 implemented in other ways.

During normal operation, boost transistor 702 switches at frequencies higher than the frequency of rectified voltage $V_{RX\_rect}$ to generate boosted DC voltage, e.g., between 20 V and 50 V, for example. For example, in some embodiments, the switching frequency of boost transistor 702 is, e.g., 1 MHz. Some embodiments may be implemented with frequencies lower than 1 MHz (such as 500 kHz, 100 kHz or lower) or higher than 1 MHz (such as 2 MHz, or higher). In some embodiments, the switching frequency of boost transistor 702 is equal to, or a multiple of the switching frequency of driving voltage $V_{TX\_drv}$. In some embodiments, the switching frequency of boost transistor 702 is variable.

In contrast with filtering capacitor 424, (which filters higher frequencies, such as the switching frequencies of LC tank 420, such as 100 kHz, but not the low frequency component of voltage $V_{RX}$, such as the 120 Hz), filtering capacitor 428, is large enough to filter the low frequency component of the voltage $V_{RX}$, thereby allowing boost converter 726 to generate a DC voltage to be supplied to LED driver 430. Due to the size of filtering capacitor 428 (which may be, e.g., 1 mF or higher, and may be rated for 20 V, 50 V, or higher), filtering capacitor 428 may be implemented as an electrolytic capacitor.

The use of a large electrolytic capacitor for supplying LED driver 430 advantageously allows for the removal of the low frequency components of voltage $V_{RX\_rect}$, thereby advantageously allowing for flicker-free operation of LED 432 powered by LED driver 430. Since LED-based light 416 is attached (e.g., latched) to wireless power transmitter 406 without any electrical cables or wires connecting LED-based light 416 and wireless power transmitter 406, LED-based light 416 may be advantageously replaced without replacing wireless power transmitter 406, thereby advantageously allowing for replacing LED-based light 416 without running a new cable 404.

In some embodiments, boost converter 726 may be implemented with power factor correction (PFC). For example, boost converter 726 may achieve PFC, for example, by reducing the conduction time (duty cycle) of boost transistor 702 when voltage $V_{RX\_rect}$ is higher, and is increasing the conduction time when voltage $V_{RX\_rect}$ lower (thus mimicking a resistor). In other words, in some embodiments, the on time of boost transistor 702 is inversely proportional to the voltage $V_{RX\_rect}$. In some embodiments, such power factor correction scheme is possible because of the low capacitance of filtering capacitor 424, which advantageously allows for continuous or almost continuous conduction of rectifier 722 (not just at the peaks of the voltage $V_{RX}$).

In some embodiments, the power factor correction achieved boost converter 726 results in an overall power factor correction of the load of transformer 402, thereby causing the load of transformer 402 to look like a resistor (or almost a resistor), with the current and voltage being in-phase (or almost in-phase), which advantageously improves the efficiency of the power transferred (from transformer 402 to LED 432).

In some embodiments, cable 404 is also used to control the state of the LED-based pool light. For example, in some embodiments, modifying the AC power signal transmitted via cable 404 controls the state of LED-based pool light 416 (e.g., to control the color pattern produced by LED-based light 416). For example, in some embodiments, turning on and off the AC power transmitter via cable 402 within a predetermined time (e.g., 10 seconds) is indicative of a command by a user (e.g., a human or controller, such as the pool controller of FIG. 3) to change the color pattern (e.g., to the next pattern, based on a predetermined sequence). In some embodiments, interrupting power, e.g., for one or more 60 Hz cycles, or delay one or more 60 Hz cycles (e.g., switching at a predetermined phase angle using a triac), is indicative of a command by the user to change the color pattern. The command to change the color pattern, or otherwise change the state of LED-based pool light 416 (e.g., turn off, change the duration in which the pool light is on, etc.) may be transmitted via cable 404 in other ways.

In an embodiment of the present invention, wireless power transmitter 406 includes a controller for receiving and decoding commands from cable 404 (e.g., sent with a pool controller) and for forwarding the command to wireless power receiver 418. The controller monitors the rectified voltage $V_{RX\_rect}$ and determines whether a command (and which command) is received from cable 404 based on the rectified voltage $V_{TX\_rect}$. The controller controls the driver 412 to modulate driving signal $V_{TX\_drv}$ to transmit the command to wireless power receiver 418 in-band using the LC tank 414. The controller is powered, e.g., via an LDO, where the LDO receives its power from rectified voltage $V_{TX\_rect}$ via a diode.

Figure 8:
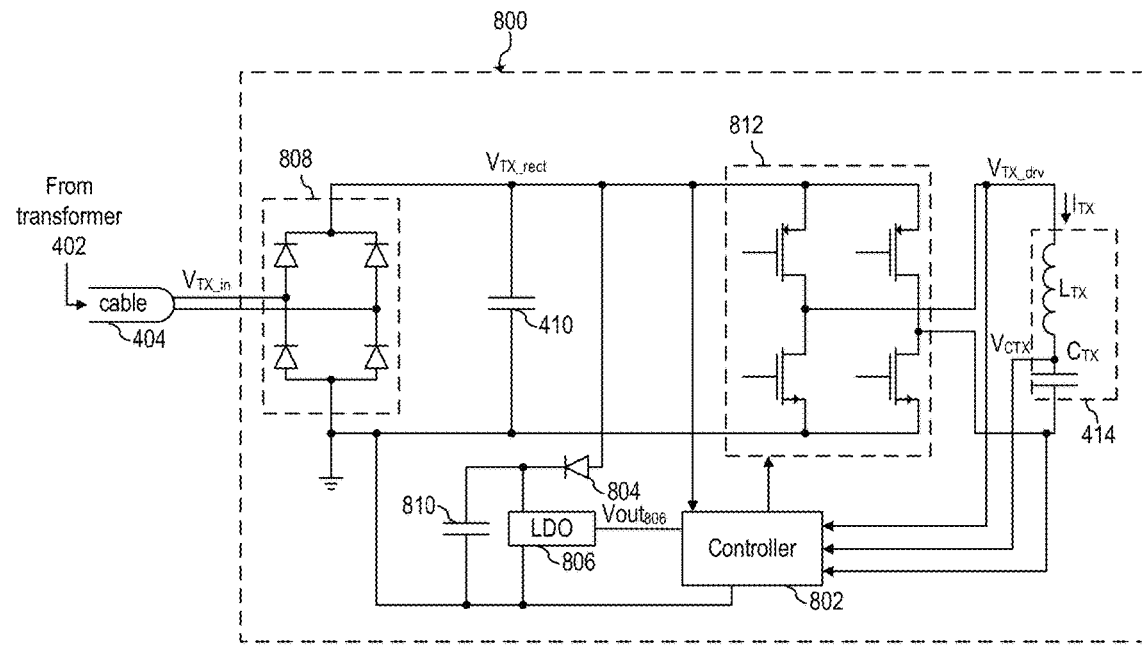
FIG. 8 shows a schematic diagram of a wireless power transmitter, according to an embodiment of the present invention.

FIG. 8 shows a schematic diagram of wireless power transmitter 800, according to an embodiment of the present invention. Wireless power transmitter 406 may be implemented as wireless power transmitter 800. Wireless power transmitter 80o includes controller 802, diode 804, LDO 806, and storage capacitor 810. LDO 806 powers controller 802. As shown in FIG. 8, rectifier 408 may be implemented with diode bridge 808 and driver 412 may be implemented with full bridge 812. It is understood that wireless power receiver 80o may be implemented with rectifier 408 and driver 412 implemented in other ways.

Controller 802 monitors the rectified voltage $V_{TX\_rect}$ for receiving (e.g., detecting) the command from transformer 402 via cable 404, and controls driver 412 for transmitting the received command to a wireless power receiver (e.g., 418 or 700) via LC tank 414.

As shown in FIG. 8, controller 802 is powered by LDO 806, which is powered via diode 804 from rectified voltage $V_{TX\_rect}$. In some embodiments, diode 804 advantageously allows for storing energy in storage capacitor 810, e.g., for powering LDO 806 and controller 802 when rectified voltage $V_{TX\_rect}$ is low (e.g., during zero-crossing of rectified voltage $V_{TX\_rect}$ and up to 30 seconds after power is removed, for example, which may be the case when a command is sent from transformer 402 using an off-on pattern) without connecting capacitor 810 in parallel with capacitor 410, thereby advantageously avoiding changing the capacitance of node $V_{TX\_rect}$ from the capacitance of capacitor 410. In some embodiments capacitor 810 may be implemented as a ceramic capacitor with a capacitance between 47 μF and 470 μF. Other capacitance values and/or other capacitor types may also be used.

In some embodiments, wireless power transmitter 800 transmits the command to a wireless power receiver (e.g., 418 or 700) using frequency-shift keying (FSK) modulation, at a rate, e.g., of 1 to 2 bits per 120 Hz cycle (the rectified signal $V_{TX\_rect}$ frequency). Other methods, such as by changing the phase between the half-bridges of driver 412, may also be used.

LDO 806 may be implemented in any way known in the art. For example, LDO 806 may be implemented with a linear amplifier having an output for controlling an output transistor. Some embodiments may use other power converters instead of, or in addition to, LDO 806, for, e.g., powering controller 802.

In some embodiments, controller 802 may be implemented as a general purpose microcontroller or processor that includes, for example, combinatorial circuits coupled to a memory. In other embodiments, controller 802 may be implemented using a custom application specific integrated circuit (ASIC). Other implementations are also possible.

In an embodiment of the present invention, a wireless power receiver includes a controller for receiving commands from a wireless power transmitter and for transmitting information to the wireless power transmitter. The controller monitors the frequency of the voltage received at the receiver's LC tank to determine the command received from the wireless power transmitter. In some embodiments, the controller transmits information to the wireless power transmitter in-band using the receiver's LC tank by performing load modulation.

Figure 9:
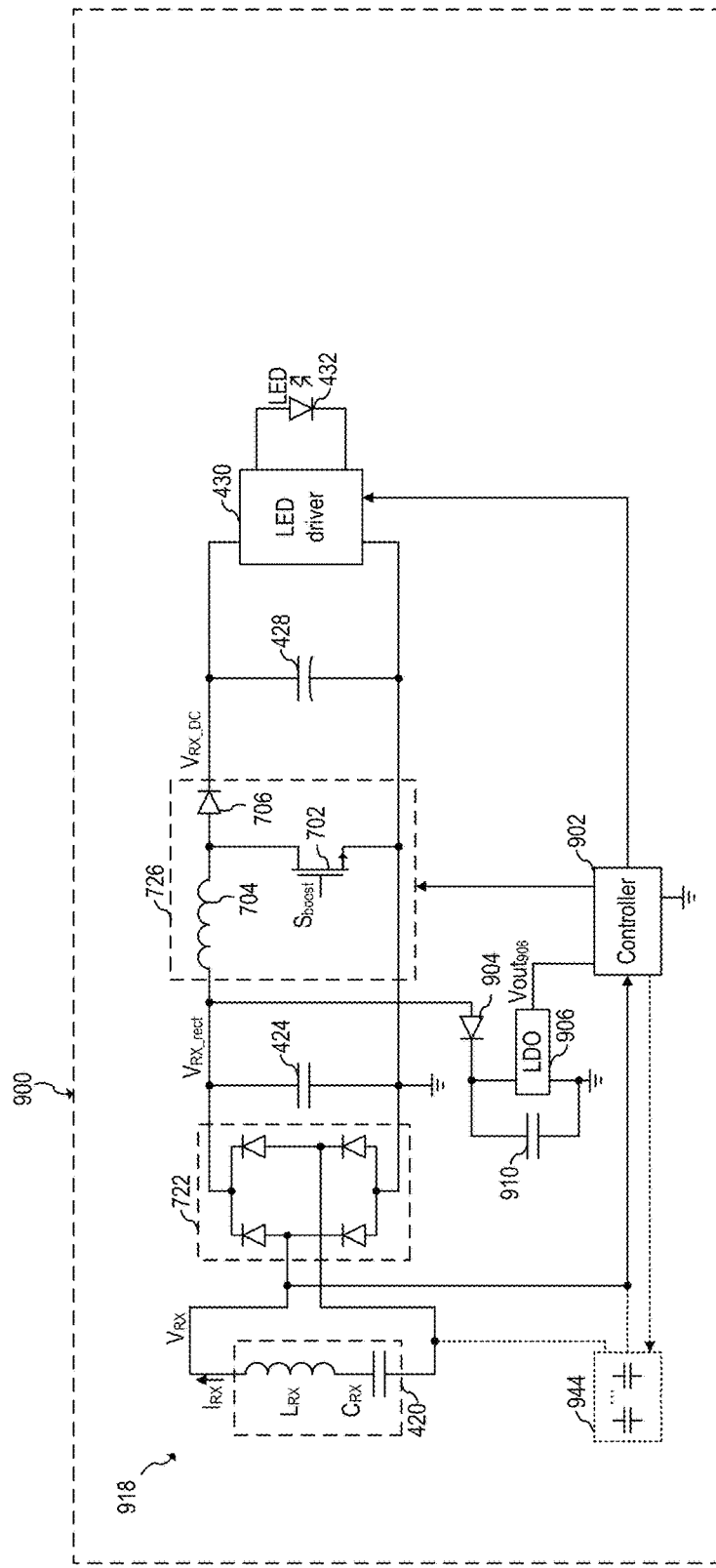
FIG. 9 shows a schematic diagram of a LED-based light, according to an embodiment of the present invention.

FIG. 9 shows a schematic diagram of LED-based light 900, according to an embodiment of the present invention. LED-based light 418 may be implemented as LED-based light 900.

LED-based light 900 includes LC tank 420, rectifier 722, boost converter 726, LDO 904, LED driver 430, LED 432, and controller 902. It is understood that LED-based light 900 may be implemented with rectifier 422 and power converter 426 implemented in other ways.

During normal operation, controller 902 monitors the voltage from LC tank 420 (e.g., by monitoring voltages $V_{RX}$) to determine whether a command is received and which command is received. In some embodiments, the determination of whether and which command is received is based on the frequency of the voltage monitored (e.g., such as when FSK modulation is used).

Controller 902 controls LED driver 430 based on the determined command (e.g., for changing the intensity or color of light produced by LED 432). In some embodiments, controller 902 also controls boost converter 726 for, e.g., implementing PFC (e.g., by controlling signal $S_{boost}$, e.g., based on voltage $V_{RX\_rect}$.

In some embodiments, controller 902 may be implemented as a general purpose microcontroller or processor that includes, for example, combinatorial circuits coupled to a memory. In other embodiments, controller 902 may be implemented using a custom application specific integrated circuit (ASIC). Other implementations are also possible.

LDO 904 powers controller 902, and is powered from rectified voltage $V_{RX\_rect}$ via diode 904. LDO 904 may be implemented in any way known in the art. For example, LDO 904 may be implemented with a linear amplifier having an output for controlling an output transistor. Some embodiments may use other power converters instead of, or in addition to, LDO 904, e.g., for powering controller 902 and/or for providing power to LED driver 430.

In some embodiments, wireless power receiver 918 transmits information to a wireless power transmitter in-band using the receiver's LC tank by performing load modulation. The information may include, e.g., voltage $V_{RX\_rect}$, the current state of LED driver 430, a fault flag, etc. In some embodiments, the load modulation is performed by modulating the on-time of boost transistor 702 so that it deviates (e.g., slightly) from the target timing for achieving PFC. Some embodiments may achieve load modulation in other ways, such as, e.g., by connecting and disconnecting capacitors 944 across the outputs of LC tank 420, or changing the phase of operating of the bridge rectifier 422 (e.g., when implemented with a synchronous rectifier), e.g., by delaying the turn-on and/or turn-off time of one or more transistors of the synchronous rectifier.

In some embodiments, in-band communication (either from wireless power receiver 918 or wireless power transmitter 800) happens only while wireless power is being transferred from wireless power transmitter 800 to wireless power receiver 918 (e.g., no communication at zero-crossings of $V_{RX}$). In some embodiments, having small values for filtering capacitors 410 and 424 advantageously allows for continuous or almost continues power transfer, thereby advantageously allowing for a higher bandwidth of in-band communication.

In some embodiments, data sent from wireless power receiver 918 to wireless power transmitter 406 includes data packets that include a preamble (e.g., 4 bits) followed by bits (e.g., 4 bits) of data on each, e.g., 120 Hz cycle. In some embodiments, the time to send each bit is 500 μs.

In some embodiments, the preamble may be used to allow controller 802 to identify the location of the data transmitted by wireless power receiver 918. In some embodiments, the preamble and data sent by wireless power receiver 918 follows the differential Manchester encoding scheme. Other encoding schemes may also be used.

In some embodiments, the load modulation performed by wireless power receiver 918 causes a small ripple on top of the AC waveform across LC tank 414, which is filtered in a known manner (e.g., using digital and/or analog filters) by wireless power transmitter 800 before controller 802 process the information. In some embodiments, the bandwidth for transmitting data from wireless power receiver 918 is between 0.1 kbits/s to 10 kbits/s. Faster and slower bandwidths are also possible.

Figure 10:
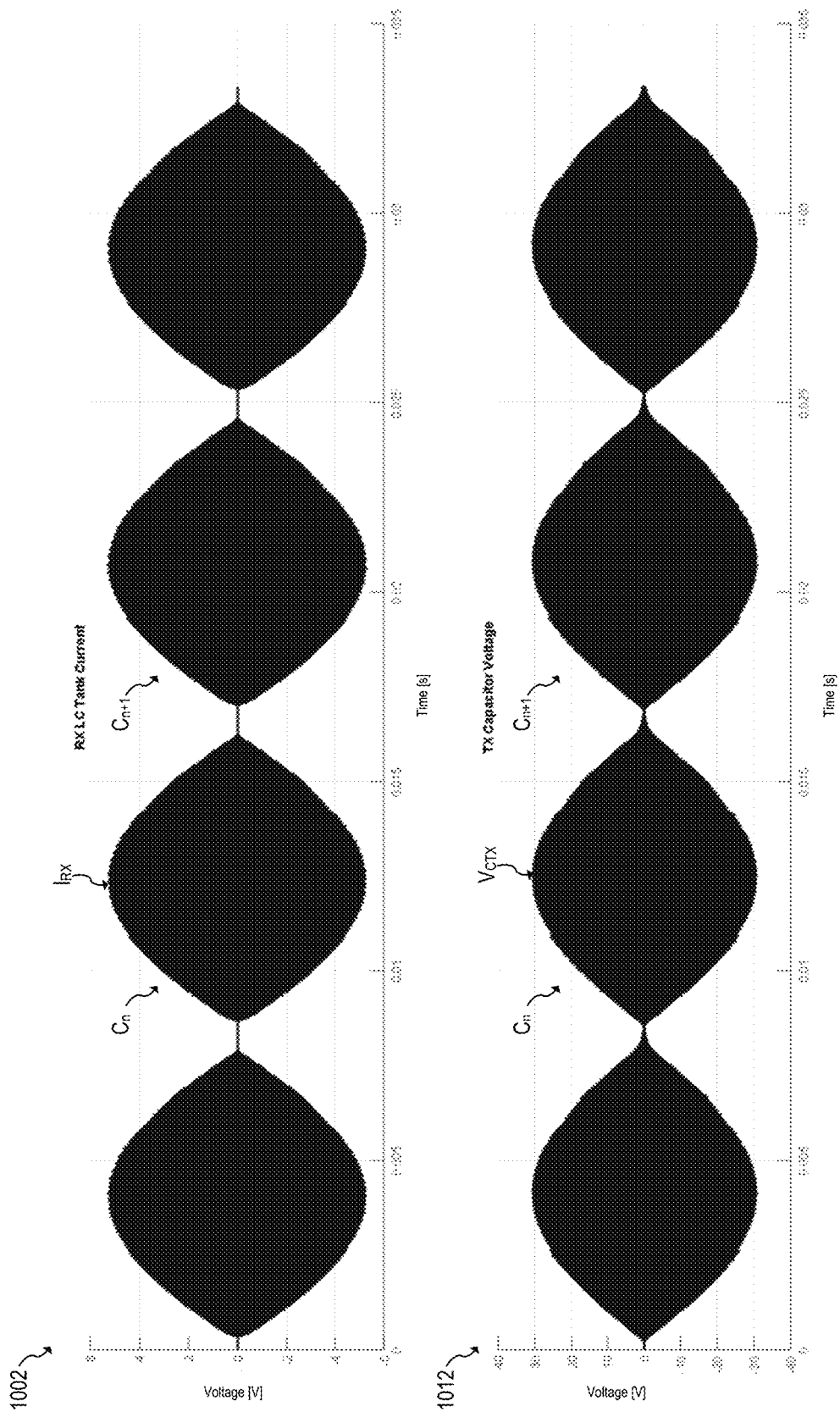
FIG. 10 shows waveforms associated with transmitting and receiving 1 byte of data per 60 Hz cycle in-band at 2 kbits/s, according to an embodiment of the present invention.

FIG. 10 shows waveforms associated with transmitting and receiving 1 byte of data per 60 Hz cycle in-band at 2 kbits/s, according to an embodiment of the present invention. Curve 1002 shows current $I_{RX}$ flowing through LC tank 420, as modulated by, e.g., controller 902. Curve 1002 shows 1 byte of modulated data per 60 Hz cycle (4 bits in cycle $C_n$, and 4 bits in cycle $C_{n+1}$). Curve 1012 shows corresponding voltage $V_{CTX}$ across capacitor $C_{TX}$ of LC tank 414, e.g., as monitored by controller 802.

In some embodiments, instead of, or in addition to in-band communication, wireless power transmitter 800 and wireless power receiver 918 may communication with each other using out-of-band communication, such as Bluetooth, WiFi, ultrasound, or infrared communication, for example.

Figure 11A:
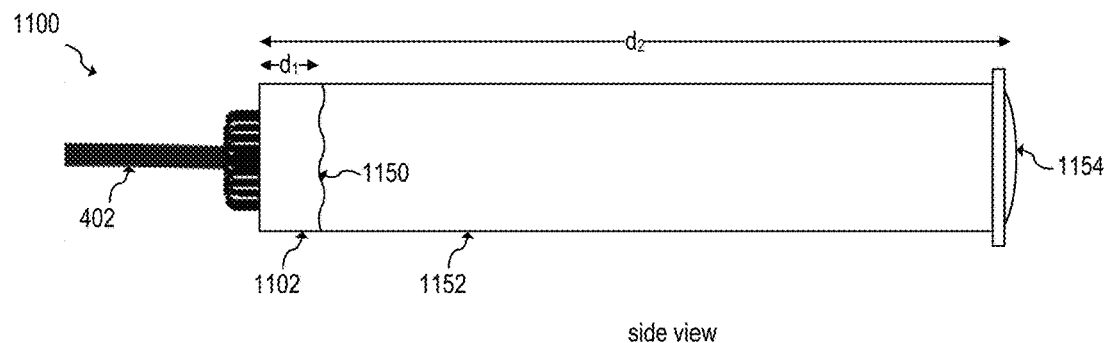
FIGS. 11A and 11B show different views of an accent light, according to an embodiment of the present invention.
Figure 11B:
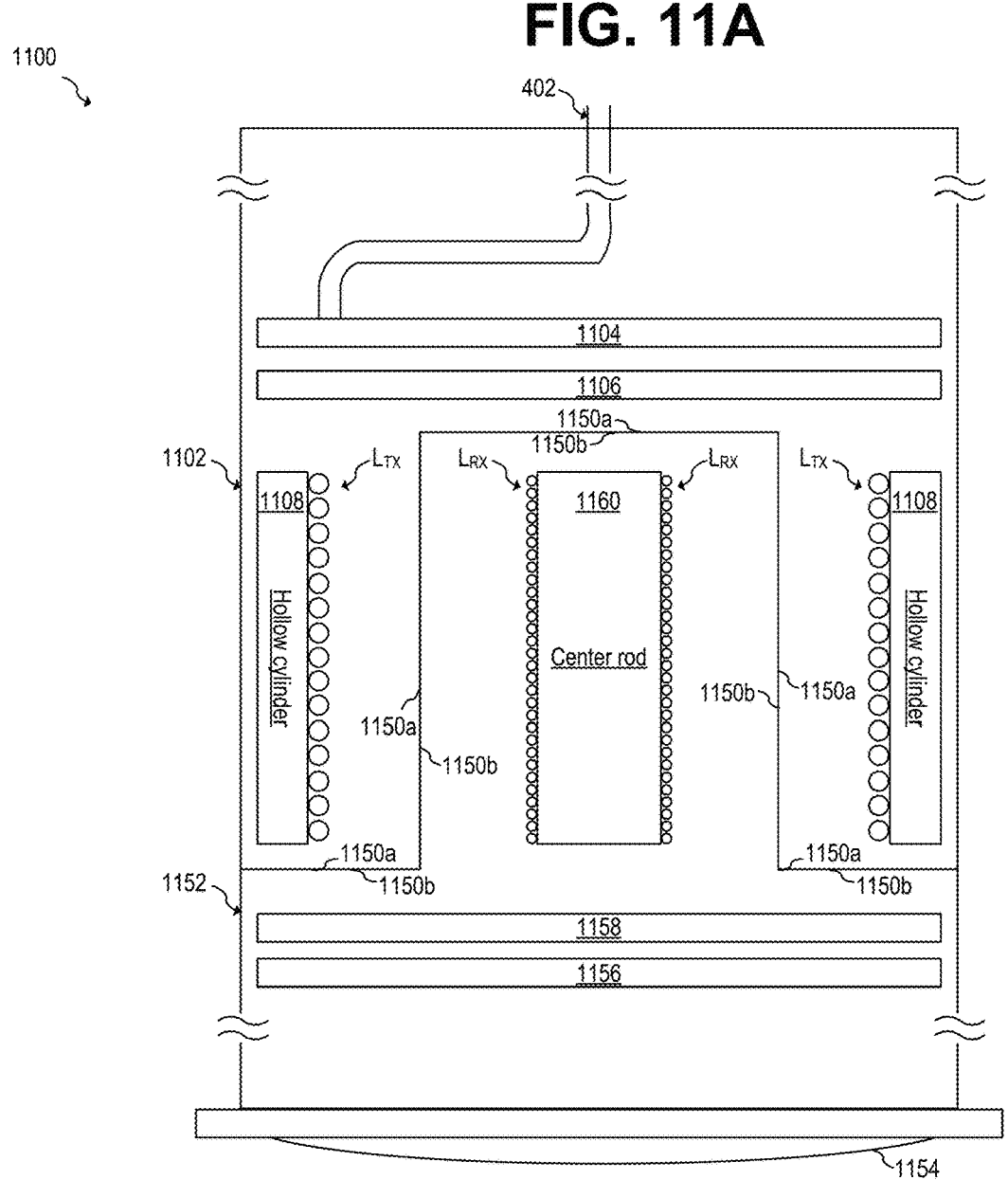

In some embodiments, transmitting coil $L_{TX}$ and receiving coil $L_{RX}$ can be cylindrical, rectangular, or flat shape, e.g., depending on the available space. For example, flat shape coils may be used in higher power applications where space is available (such as when the pool light is implemented in a niche of the pool wall). A cylindrical or rectangular implementation may be used, e.g., when space is limited, such as in an accent light. For example, FIGS. 11A and 11B show different views of accent light 1100, according to an embodiment of the present invention. Accent light 1100 includes wireless power transmitter housing 1102, LED-based light housing 1152, and cable 402.

Wireless power transmitter housing 1102 includes a portion of cable 402, one or more PCBs 1104, ferrite disc 1106, hollow cylinder 1108, and transmitting coil $L_{TX}$. The one or more PCBs 1104 include some or all of the circuits of wireless power transmitter 406.

LED-based light housing 1152 includes one or more PCBs 1156, ferrite disc 1158, center rod 1160, receiving coil $L_{RX}$, and lens 1154. The one or more PCBs 1156 include some or all of the circuits of LED-based light 416.

Wireless power transmitter housing 1102 and LED-based light housing 1152 are attached at interface 1150. In some embodiments, distance $d_1$ is less than 25% of distance $d_2$, such as 10% or lower. Other dimensions are also possible. For example, in some embodiments, distance $d_1$ is greater than 25% of distance $d_2$, such as 50% or higher.

Wireless power transmitter housing 1102 has surface 1150a configured to be attached to surface 1150b of LED-based light housing 1152 (e.g., screwed, using screws, using a locking pin, or using some other latching mechanism. In some embodiments, surface 1150a and 1150a may be separated from each other while still allowing for wireless power transfer.

Wireless power transmitter housing 1102 is sealed to be watertight. In some embodiments, wireless power transmitter housing 1102 is made with plastic and is filled with epoxy.

As shown in FIG. 11B, PCB 1104 is connected to cable 402 for receiving AC power.

In embodiments with more than one PCB 1104, the PCBs 1104 may be stacked together.

Hollow cylinder 1108 may be implemented, e.g., with a ferrite material. As shown in FIG. 11B, transmitting coil $L_{TX}$ may be located inside hollow cylinder 1108 and may be implemented, e.g., with Litz wire.

LED-based light housing 1152 is sealed to be watertight. In some embodiments, LED-based light housing 1152 is made with plastic and is filled with epoxy.

In embodiments with more than one PCB 1156, the PCBs 1156 may be stacked together.

Center rod 1160 may be implemented, e.g., with a ferrite material. As shown in FIG. 11B, receiving coil $L_{RX}$ may be located around center rod 1160 and may be implemented, e.g., with Litz wire.

Lens 1154 may be implemented, e.g., with plastic or glass. In some embodiments, a transparent decorative cover (not shown) is disposed over lens 1154.

Figure 12:
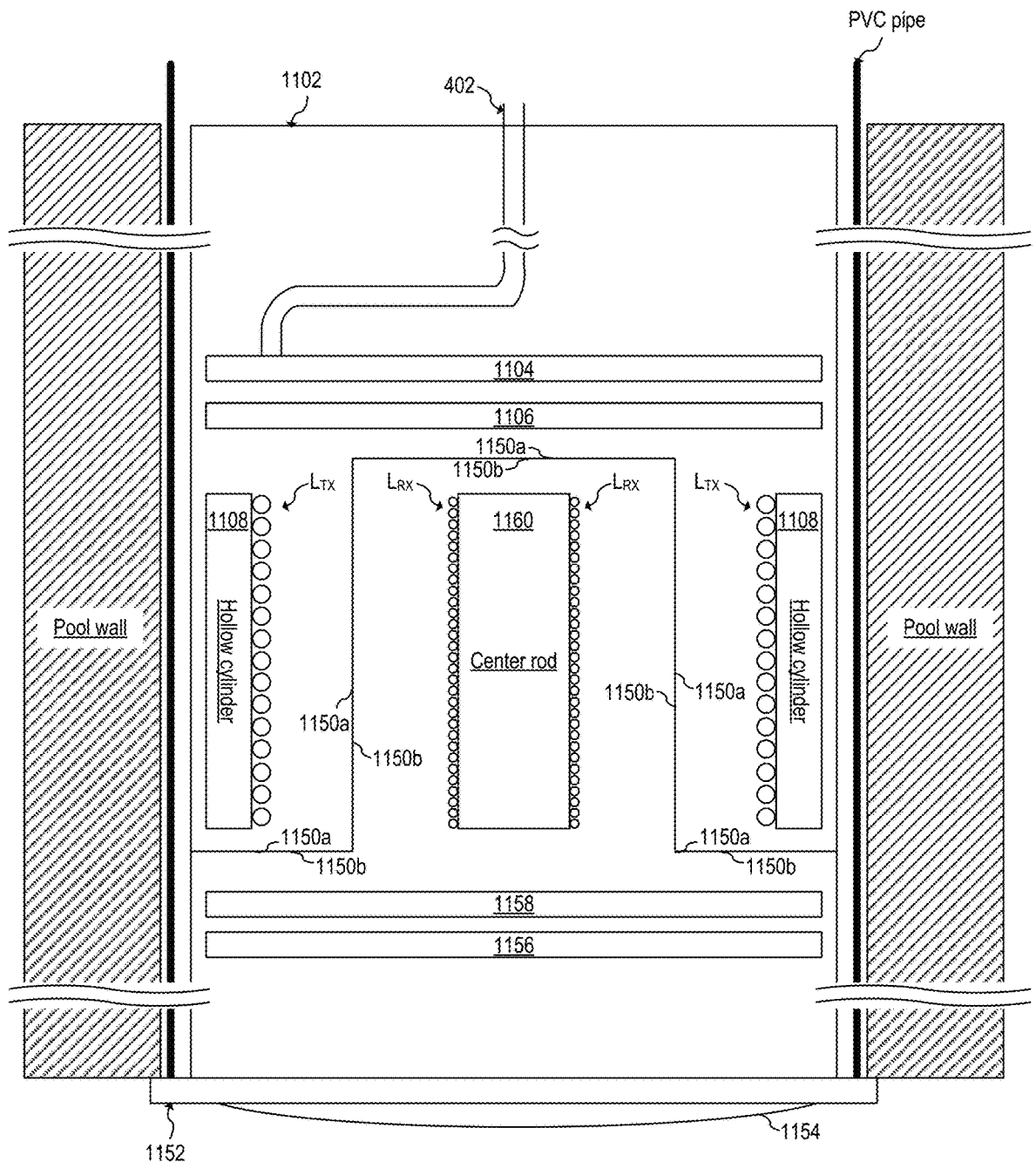
FIG. 12 shows the accent light of FIGS. 11A and 11B installed in an exemplary pool, according to an embodiment of the present invention.

FIG. 12 shows accent light 1100 installed in an exemplary pool, according to an embodiment of the present invention. The exemplary pool may be, for example, the exemplary pool shown in FIG. 2C, which includes the pool wall, and PVC pipe. Cable 404 may be located inside the PVC pipe of FIG. 2C in a similar manner, and may be connected to transformer 402, e.g., as shown in FIG. 3.

Figure 13:
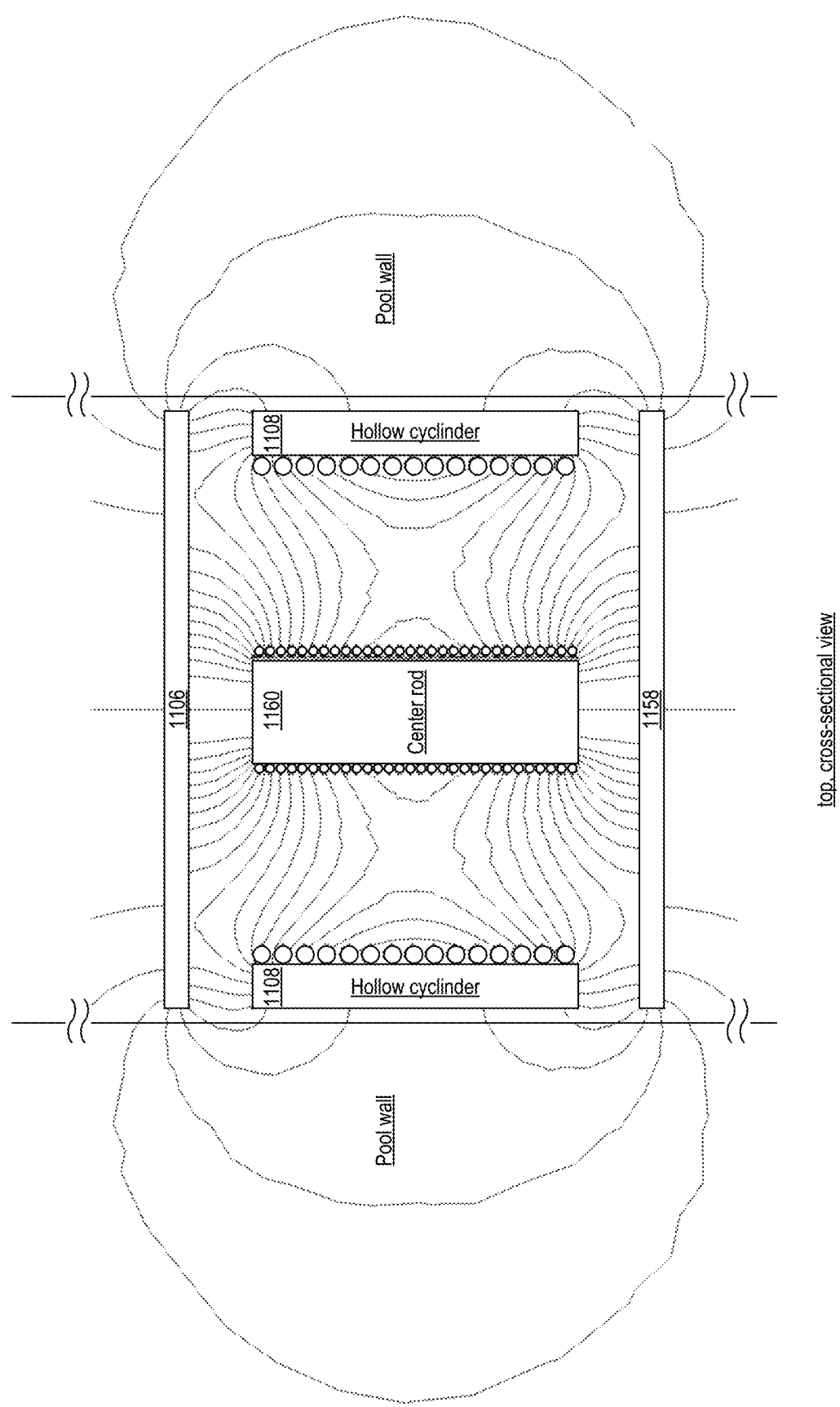
FIG. 13 shows the magnetic field radiated from the transmitting coil of the accent light of FIGS. 11A and 11B $L_{TX}$ as installed as shown in FIG. 12, according to an embodiment of the present invention.

In some embodiments, ferrite discs 1106 and 1158 improve the coupling coefficient between wireless power transmitter 406 and wireless power receiver 418, as well as protect PCBs 1104 and 1156 from the magnetic field generated by transmitting coil $L_{TX}$. For example, FIG. 13 shows the magnetic field radiated from transmitting coil $L_{TX}$ as implemented as shown in FIG. 12, according to an embodiment of the present invention.

Figure 14:
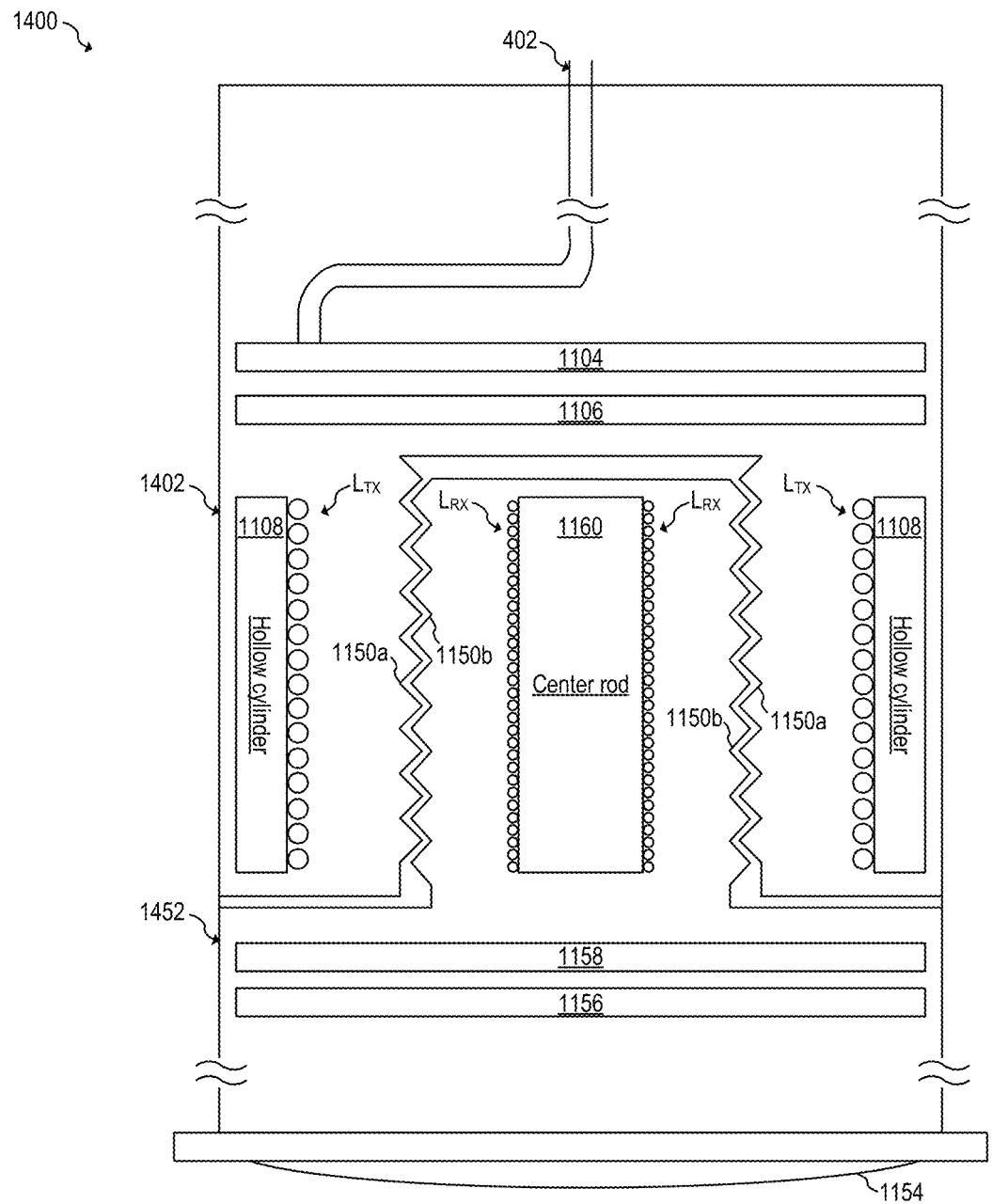
FIGS. 14 and 15 show top, cross-sectional views of accent lights, according to embodiments of the present invention.

In some embodiments, LED-based light housing 1152 is latched to wireless power transmitter housing 1102 using threads. For example, FIG. 14 shows a top, cross-sectional view of accent light 1400, according to an embodiment of the present invention. Accent light 1400 is implemented in a similar manner as accent light 1100. Accent light 1400, however, has wireless power transmitter housing 1402 and LED-based light housing 1452 latched using threads.

Figure 15:
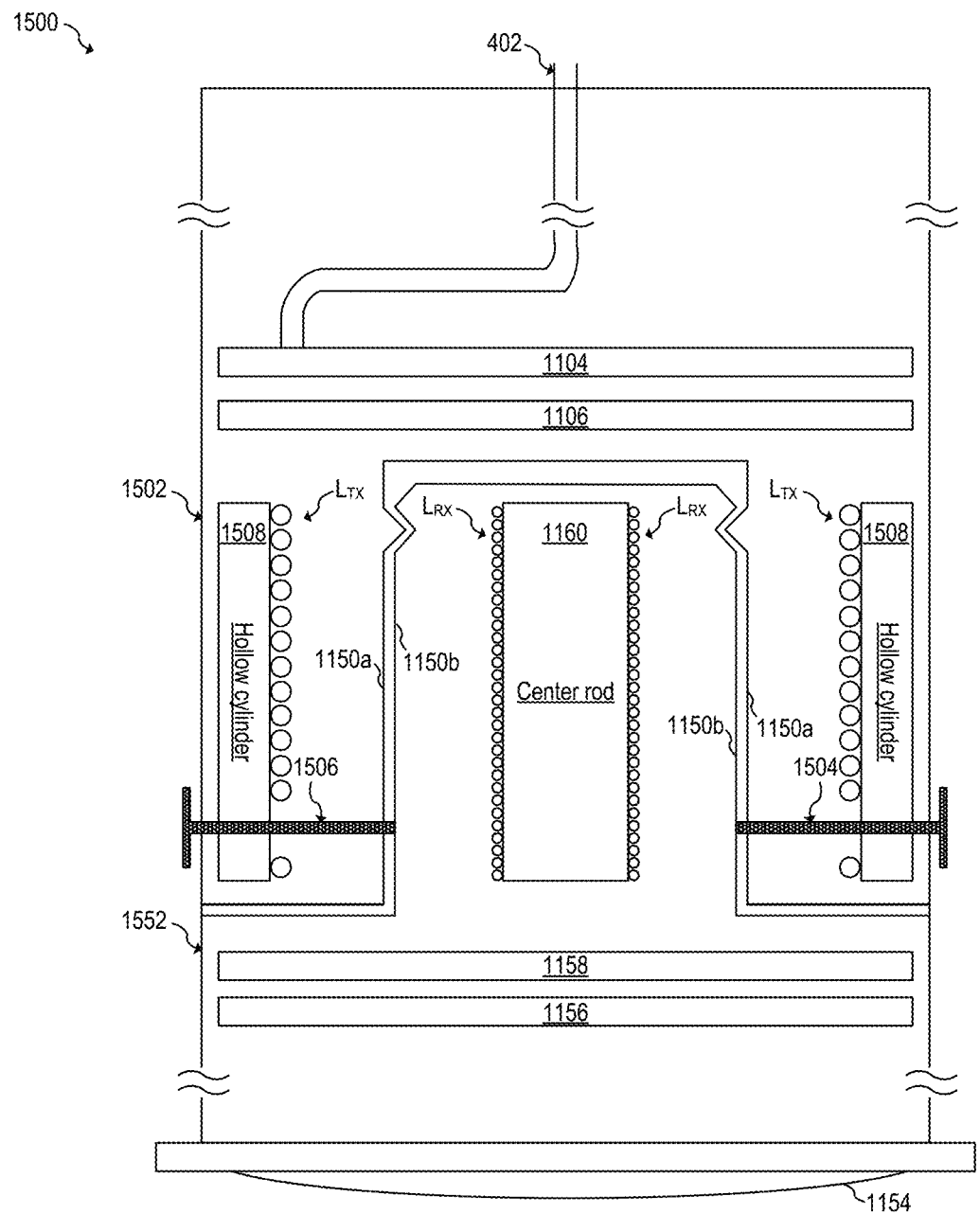

As shown in FIG. 14, surfaces 1150a and 1150b have a plurality of (e.g., plastic) threads for latching LED-based light housing 1452 to wireless power transmitter housing 1402. Some embodiments may be implemented with a single thread with a locking mechanism. For example, FIG. 15 shows a top, cross-sectional view of accent light 1500, according to an embodiment of the present invention. Accent light 1500 is implemented in a similar manner as accent light 1100. Accent light 1500, however, has wireless power transmitter housing 1502 and LED-based light housing 1552 latched using a single thread and two locking pins 1504 and 1506.

As shown in FIG. 15, some embodiments include two pins (1504 and 1506) symmetrically located in opposite sides of hollow cylinder 1508. The pins (1504 and 1506) may have a spring-based mechanism that locks in place when LED-based light housing 1552 is fully inside the cavity of wireless power transmitter housing 1502. As shown, wireless power transmitter housing 1502 and hollow cylinder 1508 have openings to allow for the pins (1504 and 1506) to be inserted. Transmitting coil $L_{TX}$ may also be arranged to allow for the pins (1504 and 1506) to be inserted.

Some embodiments may use a single pin (e.g., 1504 or 1506) instead of 2 pins for locking LED-based light housing 1552 inside the cavity of wireless power transmitter housing 1502.

By using a locking pin instead of a plurality of threads, some embodiments advantageously may be implemented in less space, since the cavity of the wireless power transmitter housing can be shorter and still allow for proper latching of the LED-based light housing.

Figure 16:
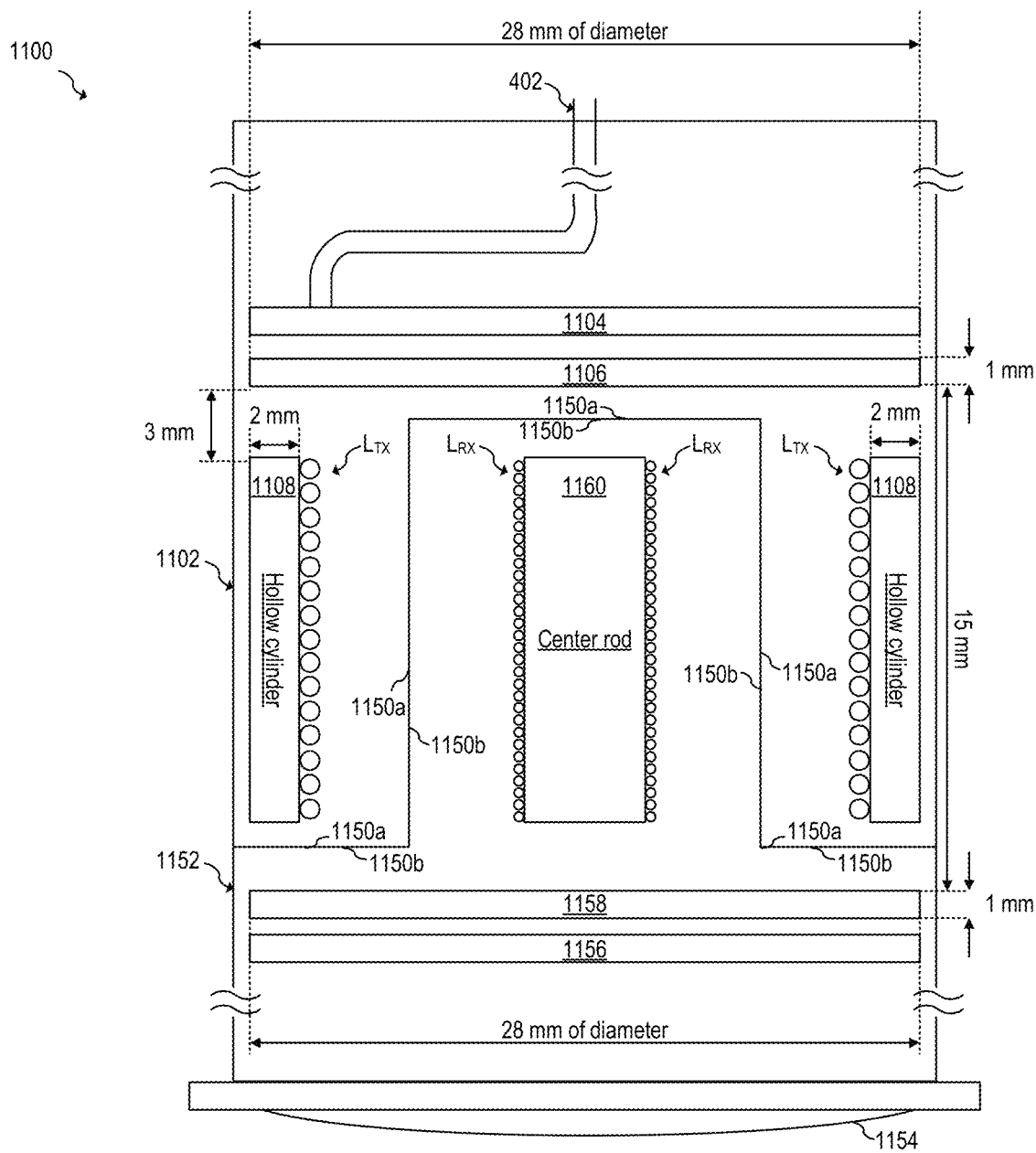
FIG. 16 shows exemplary dimensions of the accent light of FIGS. 11A and 11B, according to an embodiment of the present invention.

FIG. 16 shows exemplary dimensions of accent light 1100, according to an embodiment of the present invention. Accent lights 1400 and 1500 may also be implemented with the same dimensions. Other dimensions are also possible.

Figure 17:
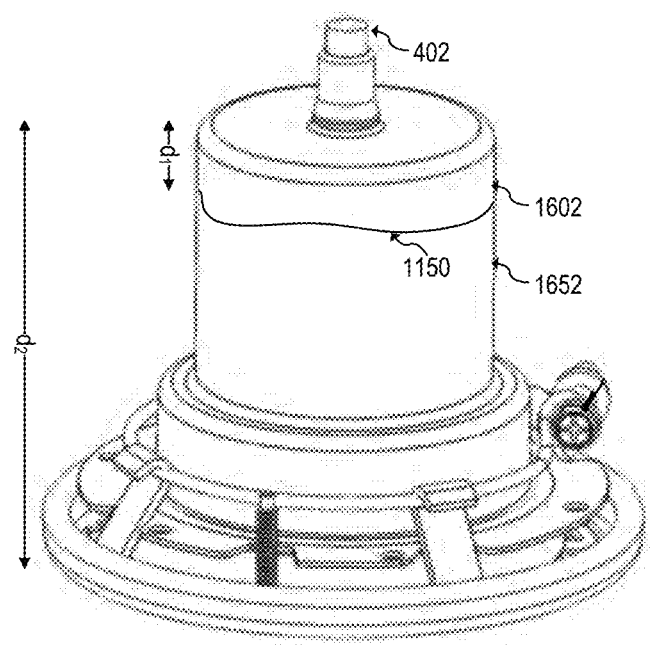
FIG. 17 shows a pool light, according to an embodiment of the present invention.

FIG. 17 shows pool light 1700, according to an embodiment of the present invention. Pool light 1700 may be implemented as accent light 1100, and may be latched by screwing LED-based light housing 1652 into wireless power transmitter housing 1602 (in a similar manner as shown in FIG. 14), or using pins (in a similar manner as shown in FIG. 15). Pool light 1700, however, is configured to be installed in a niche of a pool, such as the exemplary pool shown in FIG. 1E.

In some embodiments, transmitting coil $L_{TX}$ and receiving coil $L_{RX}$ may be implemented as flat coils (e.g., using traces in respective PCBs).

Some embodiments may be implemented in applications that are different from underwater or water-exposed applications. For example, coal mines may be exposed to flammable gases. Lighting devices can benefit from being sealed (e.g., in a similar manner than in a pool application) to prevent, e.g., sparks from the electrical circuits of the lighting device from producing an explosion. Lighting devices, such as lights 1100, 1400 and 1500, or modifications thereof, may be implemented in mines, such as coal mines. For example, in a coal mine, a device such as lights 1100, 1400, and 1500 may be installed in a structure, such as a cage or a mine wall. Portable implementations of some embodiments, such as lights 1100, 1400, and 1500, and variations thereof, are also possible.

Example embodiments of the present invention are summarized here. Other embodiments can also be understood from the entirety of the specification and the claims filed herein.

Example 1. A method for wirelessly providing power to an underwater light emitting diode (LED), the method including: receiving, with a wireless power transmitter, an input voltage via a cable, the input voltage being an alternate current (AC) voltage and having a first frequency; rectifying the input voltage with a first rectifier to generate a first rectified voltage at an output of the first rectifier, where a first filtering capacitor is coupled to the output of the first rectifier, the first filtering capacitor being a non-electrolytic capacitor; powering a driver with the first rectified voltage, the driver having an output coupled to a first resonant tank that includes a transmitting coil; wirelessly transmitting power by driving the first resonant tank with the driver with a driving voltage at a second frequency that is higher than the first frequency, where the driving voltage has a sinusoidal envelope at the first frequency and approximates a square-wave at the second frequency; receiving the wirelessly transmitted power with a second resonant tank of a wireless power receiver to generate a receiver voltage, the second resonant tank including a receiving coil; rectifying the receiver voltage with a second rectifier to generate a second rectified voltage at an output of the second rectifier, where a second filtering capacitor is coupled to the output of the second rectifier; generating a direct current (DC) voltage from the second rectified voltage with a switched-mode power supply (SMPS); and powering the LED with the DC voltage.

Example 2. The method of example 1, further including providing AC power to the cable with a transformer that is coupled to mains.

Example 3. The method of one of examples 1 or 2, where the first filtering capacitor is a ceramic capacitor.

Example 4. The method of one of examples 1 to 3, where the first filtering capacitor has a capacitance between 1 μF and 100 μF.

Example 5. The method of one of examples 1 to 4, further including powering a controller with the first rectified voltage via a first diode.

Example 6. The method of one of examples 1 to 5, further including performing power factor correction with the SMPS.

Example 7. The method of one of examples 1 to 6, where rectifying the receiver voltage includes providing current with the second rectifier for more than 75% of a rectified envelope of the second rectified voltage.

Example 8. The method of one of examples 1 to 7, further including transmitting data from the wireless power receiver to the wireless power transmitter while providing the current with the second rectifier.

Example 9. The method of one of examples 1 to 8, where the transmitted data is transmitted in a data packet that includes a preamble followed by bits of data, and where the data packet is transmitted during a cycle of the second rectified voltage, and where a duration of the cycle is 1 over the first frequency.

Example 10. The method of one of examples 1 to 9, where the SMPS is a boost converter, and where transmitting the data from the wireless power receiver to the wireless power transmitter includes changing a duty cycle modulation of the boost converter.

Example 11. The method of one of examples 1 to 10, where transmitting the data from the wireless power receiver to the wireless power transmitter includes connecting or disconnecting capacitors to the second resonant tank.

Example 12. The method of one of examples 1 to 11, where the second rectifier is a synchronous rectifier, and where transmitting the data from the wireless power receiver to the wireless power transmitter includes changing a switching angle of the synchronous rectifier.

Example 13. The method of one of examples 1 to 12, further including transmitting data from the wireless power receiver to the wireless power transmitter using radio, ultrasound, or infrared communication.

Example 14. The method of one of examples 1 to 13, where the wireless power transmitter and the wireless power receiver are located within a pool wall.

Example 15. The method of one of examples 1 to 14, further including: monitoring the input voltage; and determining a first command based on a missing cycle of the input voltage, a phase angle of the input voltage or an off time of the input voltage.

Example 16. The method of one of examples 1 to 15, further including forwarding the first command to the wireless power receiver using the transmitting coil.

Example 17. A device including: a wireless power transmitter housing including: a first PCB coupled to a cable for receiving an input voltage, the input voltage being an alternate current (AC) voltage and having a first frequency, a hollow cylinder, a first ferrite disc disposed between the first PCB and the hollow cylinder, and a transmitting coil disposed at an inner surface of the hollow cylinder; and a light housing including: a wireless power receiver including: a center rod disposed inside the hollow cylinder, a second PCB, a second ferrite disc disposed between the center rod and the second PCB, and a receiving coil surrounding the center rod, and one or more light emitting diodes (LED) coupled to the wireless power receiver.

Example 18. The device of example 17, where the light housing is screwed into a cavity of the wireless power transmitter housing.

Example 19. The device of one of examples 17 or 18, further including a locking pin for latching the light housing with the wireless power transmitter housing.

Example 20. A device including: a wireless power transmitter having an input terminal configured to receive an input voltage via a cable, the input voltage being of an alternate current (AC) type and having a first frequency, the wireless power transmitter including: a transmitting coil, a rectifier having an input coupled to the input terminal, the rectifier configured to generate a first rectified voltage at a first node, a first filtering capacitor coupled to the first node, and a driver configured to drive the transmitting coil with a driving voltage at a second frequency to wirelessly transmit power, the second frequency being higher than the first frequency, where the driving voltage has a sinusoidal envelope at the first frequency and approximates a square-wave at the second frequency.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for wirelessly providing power to an underwater light emitting diode (LED), the method comprising:

receiving, with a wireless power transmitter comprising a first rectifier, a driver and a first resonant tank, an input voltage via a cable, the input voltage being an alternate current (AC) voltage and having a first frequency;

rectifying the input voltage with the first rectifier to generate a first rectified voltage at an output of the first rectifier, wherein a first filtering capacitor is coupled to the output of the first rectifier;

powering the driver with the first rectified voltage, the driver having an input coupled to the output of the first rectifier and an output coupled to the first resonant tank, the first resonant tank comprising a transmitting coil;

wirelessly transmitting power by driving the first resonant tank, via the driver, with a driving voltage having a second frequency that is higher than the first frequency, wherein the driving voltage has a sinusoidal envelope at the first frequency and approximates a square-wave at the second frequency;

wirelessly transmitting power by driving the first resonant tank with the driving voltage;

receiving the wirelessly transmitted power with a second resonant tank of a wireless power receiver to generate a receiver voltage, the second resonant tank comprising a receiving coil;

rectifying the receiver voltage with a second rectifier to generate a second rectified voltage at an output of the second rectifier, the second rectifier being different than the first rectifier, wherein a second filtering capacitor is coupled to the output of the second rectifier;

generating a direct current (DC) voltage from the second rectified voltage with a switched-mode power supply (SMPS); and powering the underwater LED with the DC voltage.

2. The method of claim 1, further comprising providing AC power to the cable via a transformer, the transformer being coupled to a mains power supply.

3. The method of claim 1, wherein the first filtering capacitor is a ceramic capacitor.

4. The method of claim 1, wherein the first filtering capacitor has a capacitance between 1 µF and 100 µF.

5. The method of claim 1, further comprising powering a controller with the first rectified voltage via a first diode.

6. The method of claim 1, further comprising performing power factor correction with the SMPS.

7. The method of claim 1, wherein rectifying the receiver voltage comprises providing current with the second rectifier for more than 75% of a rectified envelope of the second rectified voltage.

8. The method of claim 7, further comprising transmitting data from the wireless power receiver to the wireless power transmitter while providing the current with the second rectifier.

9. The method of claim 8, wherein the transmitted data is transmitted in a data packet that comprises a preamble followed by bits of data, and wherein the data packet is transmitted during a cycle of the second rectified voltage, and wherein a duration of the cycle is over the first frequency.

10. The method of claim 8, wherein the SMPS is a boost converter, and wherein transmitting the data from the wireless power receiver to the wireless power transmitter comprises changing a duty cycle modulation of the boost converter.

11. The method of claim 8, wherein transmitting the data from the wireless power receiver to the wireless power transmitter comprises connecting or disconnecting capacitors to the second resonant tank.

12. The method of claim 8, wherein the second rectifier is a synchronous rectifier, and wherein transmitting the data from the wireless power receiver to the wireless power transmitter comprises changing a switching angle of the synchronous rectifier.

13. The method of claim 1, further comprising transmitting data from the wireless power receiver to the wireless power transmitter using radio, ultrasound, or infrared communication.

14. The method of claim 1, wherein the wireless power transmitter and the wireless power receiver are located within a pool wall.

15. The method of claim 1, further comprising:
monitoring, by a controller, the input voltage; and
determining, by the controller, a first command based on a missing cycle of the input voltage, a phase angle of the input voltage or an off time of the input voltage.

16. The method of claim 15, further comprising forwarding the first command to the wireless power receiver using the transmitting coil.

17. The method of claim 1, wherein the first filtering capacitor is a non-electrolytic capacitor.

18. A lighting device comprising:
a wireless power transmitter housing comprising:
a first printed circuit board (PCB) coupled to a cable for receiving an input voltage, the input voltage being an alternate current (AC) voltage and having a first frequency,
a hollow cylinder,
a first ferrite disc disposed between the first PCB and the hollow cylinder, and
a transmitting coil disposed at an inner surface of the hollow cylinder; and
a light housing comprising:
a wireless power receiver comprising:
a center rod disposed inside the hollow cylinder,
a second PCB,
a second ferrite disc disposed between the center rod and the second PCB, and
a receiving coil surrounding the center rod, and
one or more light emitting diodes (LED) coupled to the wireless power receiver.

19. The lighting device of claim 18, wherein the light housing is screwed into a cavity of the wireless power transmitter housing.

20. The lighting device of claim 18, further comprising a locking pin for latching the light housing with the wireless power transmitter housing.

21. A device comprising:
a wireless power transmitter having an input terminal configured to receive an input voltage via a cable, the input voltage being of an alternate current (AC) type and having a first frequency, the wireless power transmitter comprising:
a transmitting coil,
a rectifier having an input coupled to the input terminal, the rectifier configured to generate a first rectified voltage at a first node,
a first filtering capacitor coupled to the first node, and
a driver configured to provide drive the transmitting coil with a driving voltage at with a second frequency to the transmitting coil thereby to wirelessly transmit transmitting power to a wireless power receiver, the second frequency being higher than the first frequency, wherein the driving voltage has a sinusoidal envelope at the first frequency and approximates a square-wave at the second frequency.

* * * * *